US010891594B2

(12) United States Patent  
Martin

(10) Patent No.: US 10,891,594 B2  
(45) Date of Patent: Jan. 12, 2021

(54) CALENDAR INTERFACE

(71) Applicant: MPR SYSTEMS PTY LTD, The Gap (AU)

(72) Inventor: Bruce Martin, The Gap (AU)

(73) Assignee: MRP SYSTEMS PTY LTD, The Gap (AU)

( * ) Notice: Subject to any disclaimer, the term of this patent is extended or adjusted under 35 U.S.C. 154(b) by 989 days.

(21) Appl. No.: 15/318,183

(22) PCT Filed: Jun. 12, 2015

(86) PCT No.: PCT/AU2015/050326  
§ 371 (c)(1),  
(2) Date: Dec. 12, 2016

(87) PCT Pub. No.: WO2015/188234  
PCT Pub. Date: Dec. 17, 2015

(65) Prior Publication Data  
US 2017/0124517 A1 May 4, 2017

(30) Foreign Application Priority Data

Jun. 13, 2014 (AU) .................................. 2014902249

(51) Int. Cl.  
*G06Q 10/10* (2012.01)  
*G06F 3/0481* (2013.01)  
*G06F 3/0484* (2013.01)

(52) U.S. Cl.  
CPC ....... *G06Q 10/1093* (2013.01); *G06Q 10/109* (2013.01); *G06F 3/0481* (2013.01); *G06F 3/04847* (2013.01)

(58) Field of Classification Search  
CPC .............. G06F 3/0481; G06F 3/04847; G06Q 10/1093; G06Q 10/109  
See application file for complete search history.

(56) References Cited

U.S. PATENT DOCUMENTS 6,522,347 B1 2/2003 Tsuji et al.  
6,819,344 B2 11/2004 Robbins  
(Continued)

FOREIGN PATENT DOCUMENTS

WO  WO 2012/164434  12/2012

OTHER PUBLICATIONS

Pan Calendars, Calendar app displaying multiple calendars and multiple time zones, URL: http://www.pancalendars.com/, date unestablished.

(Continued)

*Primary Examiner* — Tadesse Hailu  
(74) *Attorney, Agent, or Firm* — Maschoff Brennan

(57) ABSTRACT

Described herein is a computer implemented method for generating a calendar interface. The method includes determining a total time period value indicating a total time period to be displayed, determining a segment duration, determining an interval duration, calculating timeline coordinates defining a timeline extending from a foreground of the display to a background of the display and having a perspective appearance, and displaying a timeline in accordance with the timeline coordinates. The timeline coordinates define the timeline to have a plurality of segments, each segment representing a period of time within the total time period equal to the segment duration. Each segment is composed of a plurality of timeline intervals, each timeline interval representing a period of time within the total time period equal to the interval duration. Each segment has a display length, and wherein the display length of a segment representing an earlier period of time is longer than a display length of a segment representing a later period of time. A given segment travels in a direction that is re-entrant relative to a direction travelled by an adjacent segment.

16 Claims, 13 Drawing Sheets

(56) References Cited

U.S. PATENT DOCUMENTS

| | | | |
|---|---|---|---|
| 7,257,778 B2 | 8/2007 | Kekki et al. | |
| 7,802,205 B2 | 9/2010 | Bedingfield | |
| 8,166,415 B2* | 4/2012 | Cisler | G06F 3/0481 715/778 |
| 8,255,817 B2 | 8/2012 | Faught | |
| 2002/0054158 A1* | 5/2002 | Asami | G06F 3/04815 715/838 |
| 2003/0016239 A1 | 1/2003 | Christopher | |
| 2003/0038831 A1 | 2/2003 | Engelfriet | |
| 2005/0091596 A1* | 4/2005 | Anthony | G06F 3/04815 715/712 |
| 2006/0156237 A1* | 7/2006 | Williams | G06F 16/447 715/720 |
| 2008/0034307 A1* | 2/2008 | Cisler | G06F 3/0481 715/764 |
| 2010/0020048 A1* | 1/2010 | Narita | G06F 3/04815 345/204 |
| 2010/0088388 A1* | 4/2010 | Donovan | G06Q 10/109 709/207 |
| 2010/0157742 A1 | 6/2010 | Relyea et al. | |
| 2010/0167712 A1 | 7/2010 | Stallings et al. | |
| 2011/0202866 A1 | 8/2011 | Huang et al. | |
| 2013/0185642 A1* | 7/2013 | Gammons | G06F 3/0482 715/733 |
| 2014/0068485 A1* | 3/2014 | El-Jayousi | G06F 3/0481 715/771 |
| 2015/0294275 A1* | 10/2015 | Richardson | G06F 16/26 705/7.18 |
| 2016/0350721 A1* | 12/2016 | Comerford | G06Q 10/1095 |

OTHER PUBLICATIONS

Article 15(5) International Type Search for Australian Provisional Patent Application No. 201402249, dated May 12, 2015.
Patent Examination Report from Australian Patent Application No. 2015203181, dated Jul. 29, 2015.
International Search Report from PCT/AU2015/050326, dated Jul. 30, 2015.
Written Opinion of the International Searching Authority from PCT/AU2015/050326, dated Jul. 30, 2015.

* cited by examiner

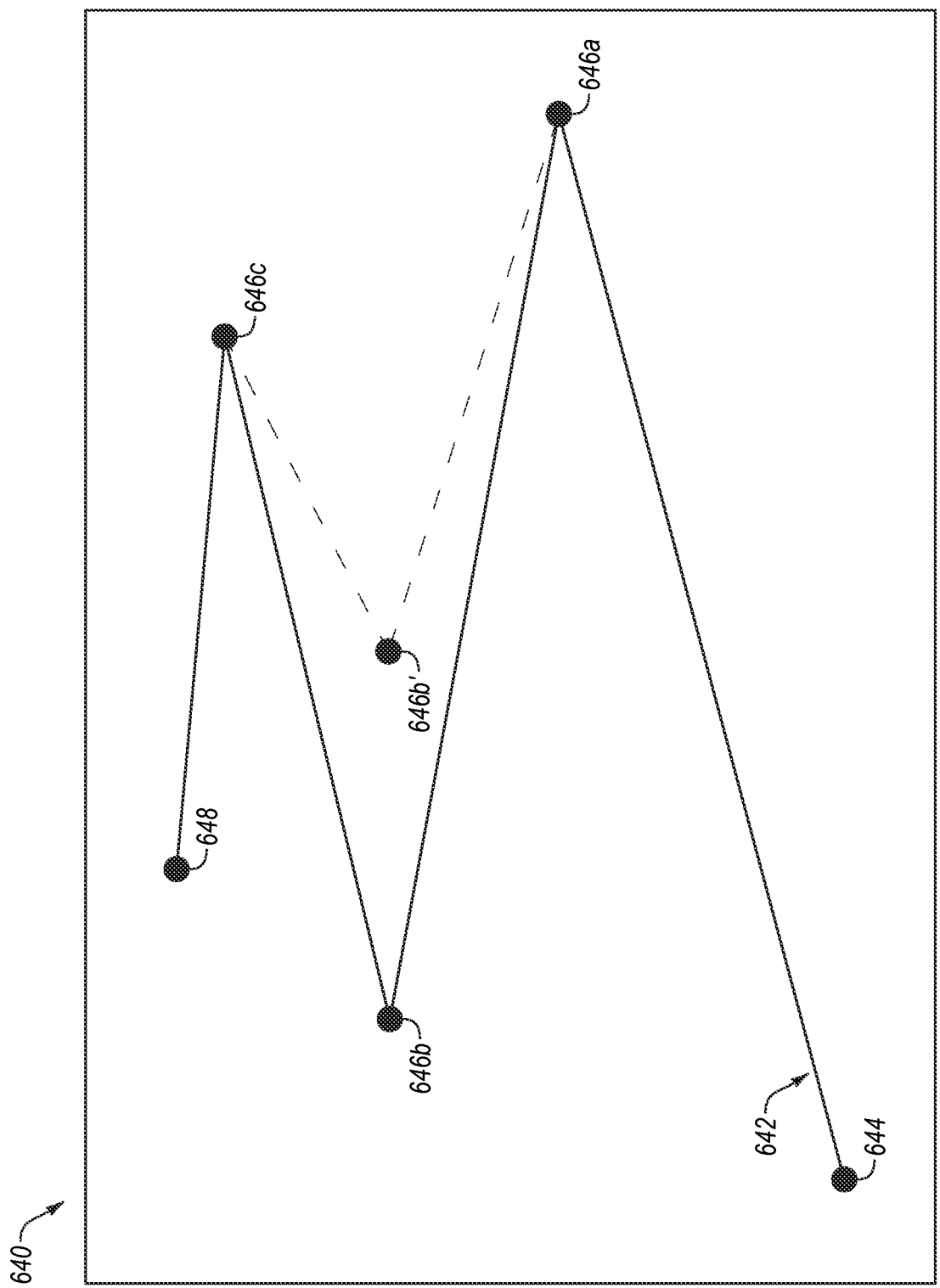

CALENDAR INTERFACE

FIELD OF THE INVENTION

The present disclosure relates to systems and methods for generating and displaying a calendar interface on an electronic device.

BACKGROUND OF THE INVENTION

Calendars allow users to view information such as dates, times, events, and time intervals.

Increasingly, instead of (or as well as) relying on paper calendars people are viewing and managing calendar information on electronic devices such as computers and mobile phones.

A problem with this, however, is that as more information is included and displayed calendars become visually complex. This can lead to users having difficulty in easily assessing the information being presented. This can be particularly problematic when viewing calendars on portable electronic devices with smaller screens, and is further exacerbated if a user attempts to view multiple calendars at the same time.

Accordingly, it would be desirable to provide a calendar interface for an electronic device which presents calendar information to a user in a simpler and/or more intuitive manner. Alternatively, it would be desirable to provide a useful alternative to existing electronic calendar interfaces.

SUMMARY OF THE INVENTION

Described herein is a computer implemented method for generating a calendar interface for display on an electronic device display, the method including: determining a total time period value indicating a total time period to be displayed; determining a segment duration; determining an interval duration; calculating timeline coordinates defining a timeline extending from a foreground of the display to a background of the display and having a perspective appearance; displaying, on the display, a timeline in accordance with the timeline coordinates; determining one or more calendar items, each calendar item being associated with a time occurring in the total time period; and displaying, on the display, at least one calendar item in a position on the timeline associated with the calendar item's associated time; wherein: the timeline coordinates define the timeline to have a plurality of segments; each segment represents a period of time within the total time period equal to the segment duration; each segment is composed of a plurality of timeline intervals, each timeline interval representing a period of time within the total time period equal to the interval duration; each segment has a display length, and wherein the display length of a segment representing an earlier period of time is longer than a display length of a segment representing a later period of time; and a given segment travels in a direction that is re-entrant relative to a direction travelled by an adjacent segment.

Calculating timeline coordinates may include calculating starting point coordinates for each of the plurality of timeline intervals based on the total time period value, the segment duration, and the interval duration.

Calculating timeline coordinates may include calculating coordinates of a timeline start point, a timeline end point, and one or more timeline inflection points.

Each timeline interval may be represented by an interval line.

For a given segment, interval lines representing time periods occurring closer to the middle of the day may be longer than interval lines representing time periods occurring closer to the middle of the night.

The method may include generating and displaying at least two timelines.

The at least two timelines may be generated and displayed such that a straight line passing through the timelines indicates a same time on each timeline.

The at least two timelines may be in different timezones and may be generated and displayed such that a horizontal line passing through the timelines indicates a same absolute time on each timeline.

The method may further include displaying interval markers at locations corresponding to the starting points of each timeline interval.

Timeline intervals or parts thereof associated with a calendar item may be visually distinguished from timeline intervals or parts thereof that are not associated with a calendar item.

Timeline intervals or parts thereof may be visually distinguished by one or more of: a different line colour; a different line weight; a different line composition.

The method may further include displaying an adjustable reference line indicating a point in time on the timeline, and wherein only calendar items associated with the point in time indicated by the adjustable reference line are displayed.

The timeline may be a curved timeline with coordinates based on a sinusoidal equation.

Each timeline segment may be a substantially straight line extending between adjacent control points, the control points including the timeline start point, the timeline end point, and the one or more timeline inflection points.

The method may further include determining a theme for the calendar interface, the theme including at least a background image atop which the timeline is displayed; and applying the theme to the calendar interface.

Also described herein is an electronic device including: a processing unit; a display; and computer-readable memory storing instructions which, when executed by said processing unit, cause said processing perform a method according to any one or more of the above statements.

Also described herein is non-transient memory storing instructions executable by a computer processing unit to perform a method according to any one of the above statements.

BRIEF DESCRIPTION OF THE DRAWINGS

Illustrative embodiments will now be described by way of non-limiting example only, with reference to the accompanying drawings. In the drawings:

FIGS. 6B, 6C, and 6D show development views re the generation of a straight-segment timeline calendar interface.

Where the Figures represent the same or similar features the same reference numerals will be used.

DETAILED DESCRIPTION OF THE EMBODIMENTS

The present invention generally relates to systems and methods for generating and displaying a calendar interface on an electronic device. As is described in detail below, the interface allows for the generation, viewing, and manipulation of calendar data.

Computer Processing System

The present invention is necessarily implemented using an electronic device. The electronic device is, or will include, a computer processing system.

Figure 1:
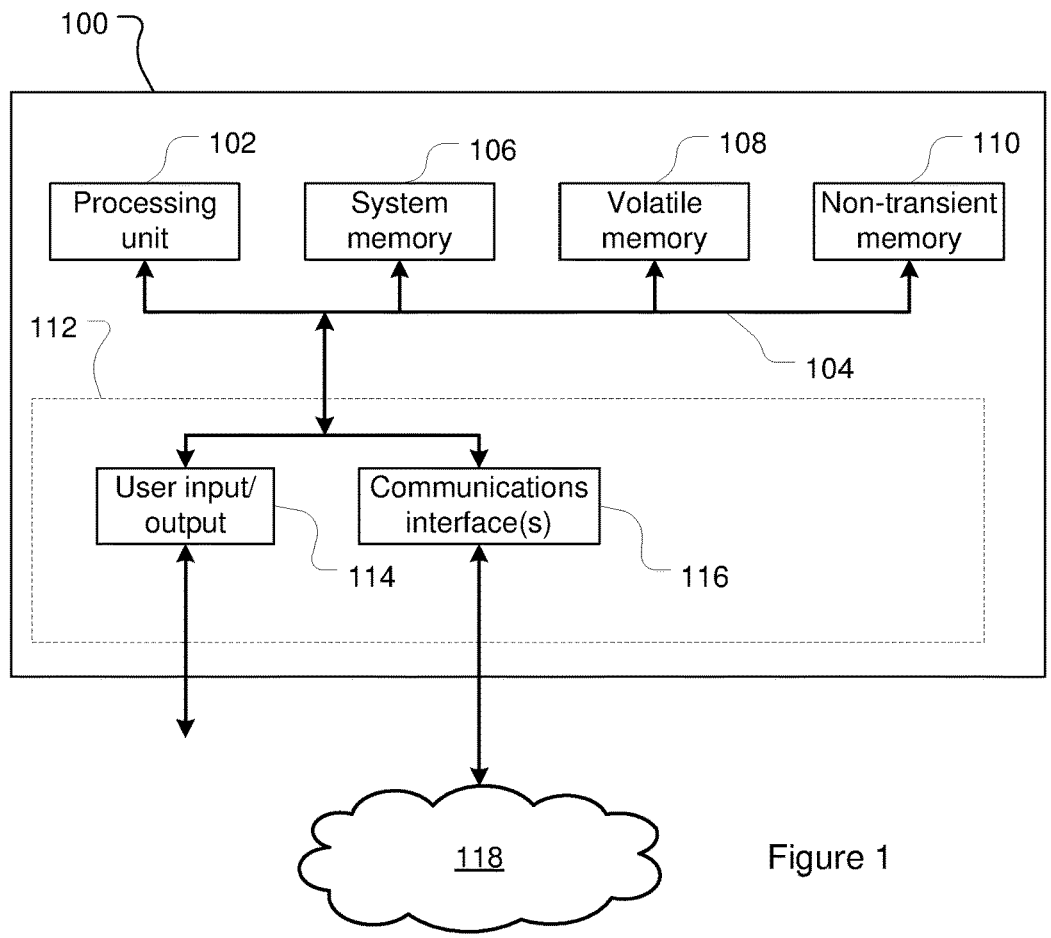
FIG. 1 is a block diagram showing an example of a computer processing system.

FIG. 1 provides a block diagram of one example of a computer processing system 100. System 100 as illustrated in FIG. 1 is a general-purpose computer processing system. It will be appreciated that FIG. 1 does not illustrate all functional or physical components of a computer processing system. For example, no power supply or power supply interface has been depicted, however system 100 will either carry a power supply or be configured for connection to a power supply (or both). It will also be appreciated that the particular type of computer processing system will determine the appropriate hardware and architecture, and alternative computer processing systems suitable for implementing aspects of the invention may have additional, alternative, or fewer components than those depicted, combine two or more components, and/or have a different configuration or arrangement of components.

The computer processing system 100 includes at least one processing unit 102. The processing unit 102 may be a single computer-processing device (e.g. a central processing unit, graphics processing unit, or other computational device), or may include a plurality of computer processing devices. In some instances all processing will be performed by processing unit 102, however in other instances processing may also, or alternatively, be performed by remote processing devices accessible and useable (either in a shared or dedicated manner) by the system 100.

Through a communications bus 104 the processing unit 102 is in data communication with a one or more machine-readable storage (memory) devices that store instructions and/or data for controlling operation of the processing system 100. In this instance system 100 includes a system memory 106 (e.g. a BIOS), volatile memory 108 (e.g. random access memory such as one or more DRAM modules), and non-volatile memory 110 (e.g. one or more hard disk or solid state drives).

System 100 also includes one or more interfaces, indicated generally by 112, via which system 100 interfaces with various devices and/or networks. Generally speaking, other devices may be physically integrated with system 100, or may be physically separate. Where a device is physically separate from system 100, connection between the device and system 100 may be via wired or wireless hardware and communication protocols, and may be a direct or an indirect (e.g. networked) connection.

Wired connection with other devices/networks may be by any appropriate standard or proprietary hardware and connectivity protocols. For example, system 100 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are, of course, possible.

Wireless connection with other devices/networks may similarly be by any appropriate standard or proprietary hardware and communications protocols. For example, system 100 may be configured for wireless connection with other devices/communications networks using one or more of: infrared; Bluetooth; Wi-Fi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are, of course, possible.

Generally speaking, the devices to which system 100 connects—whether by wired or wireless means—allow data to be input into/received by system 100 for processing by the processing unit 102, and data to be output by system 100. Example devices are described below, however it will be appreciated that not all computer-processing systems will include all mentioned devices, and that additional and alternative devices to those mentioned may well be used.

For example, system 100 may include or connect to one or more input devices by which information/data is input into (received by) system 100. Such input devices may include physical buttons, alphanumeric input devices (e.g. keyboards), pointing devices (e.g. mice, track pads and the like), touchscreens, touchscreen displays, microphones, accelerometers, proximity sensors, GPS devices and the like. System 100 may also include or connect to one or more output devices controlled by system 100 to output information. Such output devices may include devices such as indicators (e.g. LED, LCD or other lights), displays (e.g. CRT displays, LCD displays, LED displays, plasma displays, touch screen displays), audio output devices such as speakers, vibration modules, and other output devices. System 100 may also include or connect to devices which may act as both input and output devices, for example memory devices (hard drives, solid state drives, disk drives, compact flash cards, SD cards and the like) which system 100 can read data from and/or write data to, and touch-screen displays which can both display (output) data and receive touch signals (input).

System 100 may also connect to communications networks (e.g. the Internet, a local area network, a wide area network, a personal hotspot etc.) to communicate data to and receive data from networked devices, which may themselves be other computer processing systems.

It will be appreciated that system 100 may be any suitable computer processing system such as, by way of non-limiting example, a desktop computer, a laptop computer, a netbook computer, tablet computer, a smart phone, a Personal Digital Assistant (PDA), a cellular telephone, a web appliance. Typically, system 100 will include at least user input and output devices 114 and (if the system is to be networked) a communications interface 116 for communication with a network 118. The number and specific types of devices which system 100 includes or connects to will depend on the particular type of system 100. For example, if system 100 is a desktop computer it will typically connect to physically separate devices such as (at least) a keyboard, a pointing device (e.g. mouse), a display device (e.g. a LCD display). Alternatively, if system 100 is a laptop computer it will typically include (in a physically integrated manner) a keyboard, pointing device, a display device, and an audio output device. Further alternatively, if system 100 is a tablet device or smartphone, it will typically include (in a physically integrated manner) a touchscreen display (providing both input means and display output means), an audio output device, and one or more physical buttons.

System 100 stores or has access to instructions and data which, when processed by the processing unit 102, configure system 100 to receive, process, and output data. Such instructions and data will typically include an operating system such as Microsoft Windows®, Apple OSX, Apple IOS, Android, Unix, or Linux.

System 100 also stores or has access to instructions and data (i.e. software) which, when processed by the processing unit 102, configure system 100 to perform various computer-implemented processes/methods in accordance with embodiments of the invention (as described below). It will be appreciated that in some cases part or all of a given computer-implemented method will be performed by system 100 itself, while in other cases processing may be performed by other devices in data communication with system 100.

Instructions and data are stored on a non-transient machine-readable medium accessible to system 100. For example, instructions and data may be stored on non-transient memory 110. Instructions may be transmitted to/received by system 100 via a data signal in a transmission channel enabled (for example) by a wired or wireless network connection.

Electronic Device

Figure 2:
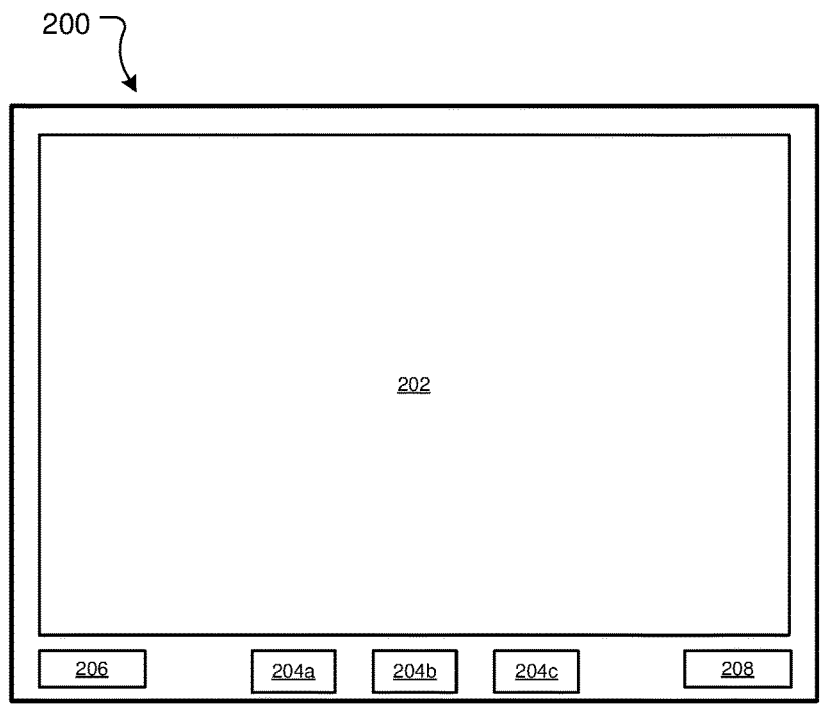
FIG. 2 is a depiction of an electronic device.

In one embodiment, the present invention is implemented on an electronic device with a touchscreen display, for example a smart phone or tablet computer. FIG. 2 provides a depiction of such an electronic device 200. Device 200 is a type computer processing system 100 (as described above), and as such includes computer processing system components such as processing unit 102, bus 104, and memory 106, 108, and/or 110.

Device 200 also includes (in this instance) communications interfaces allowing device 200 to wirelessly connect to a mobile telecommunications network (e.g. 3G or 4G network) and a data network (e.g. via Wi-Fi).

Device 200 also includes (in a physically integrated manner) a touchscreen display 202, physical buttons 204a, 204b, and 204c, a microphone 206, and a speaker 208.

Embodiments of calendar interfaces and the generation thereof will be described with reference to their implementation on or by an electronic device such as device 200. It will be appreciated, though, that the interface could well be implemented by other computer processing systems.

Calendar Interface

Figure 3:
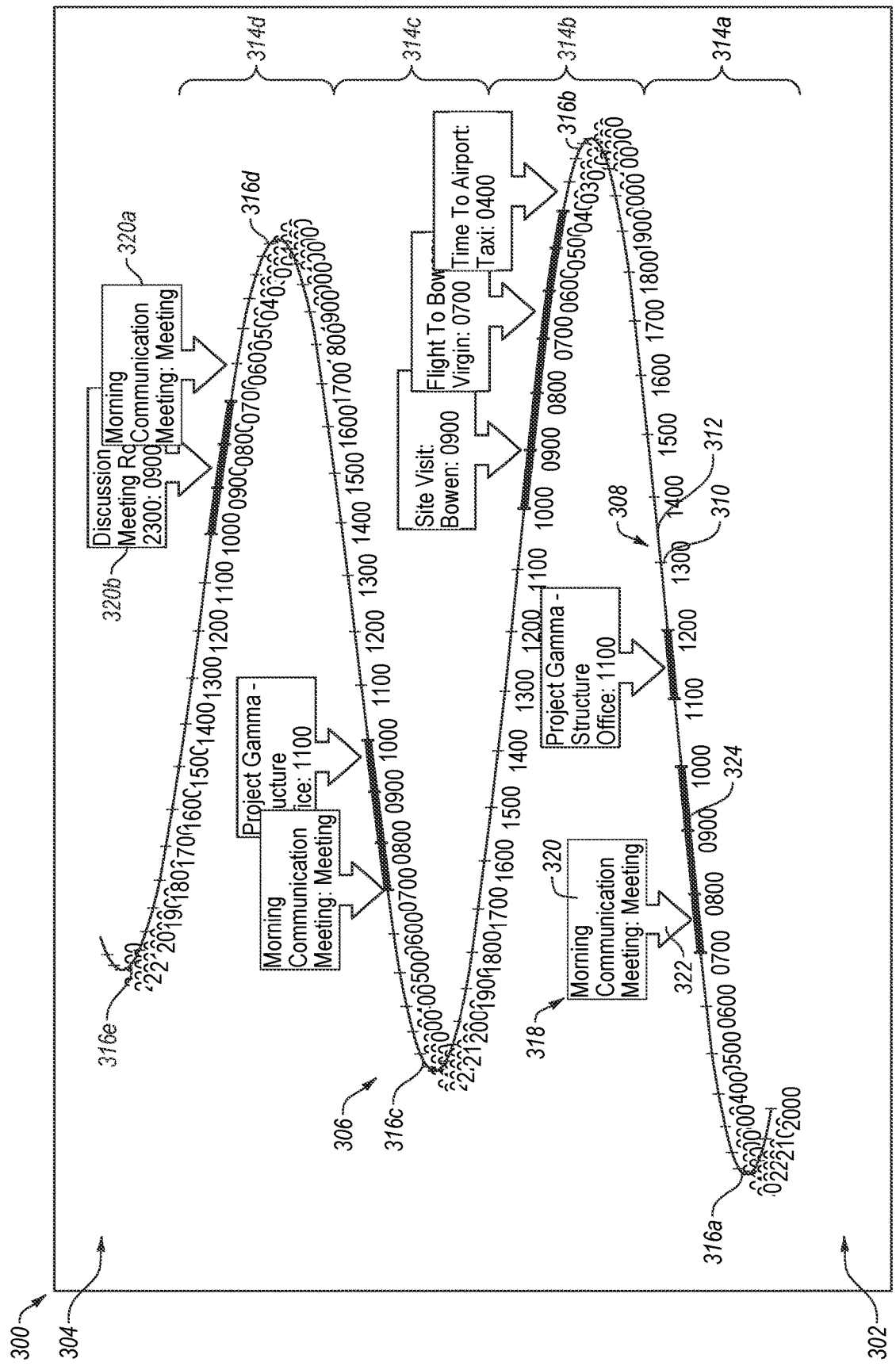
FIG. 3 is an example calendar interface in accordance with an embodiment of the invention.

FIG. 3 shows one example of a calendar interface 300 for presentation on a display (such as touchscreen display 202) in accordance with an embodiment of the invention. Calendar interface 300 is depicted in the orientation intended for viewing by a user, e.g. with a foreground 302 at a bottom of the interface 300 and a background 304 at the top of the interface 300.

Calendar interface 300 includes a timeline 306 extending from the foreground 302 of the interface 300 to the background 304 of the interface 300. Timeline 306 is configured such that times appearing closer to the foreground 302 on the timeline 306 are earlier than times appearing closer to the background 304. Timeline 306 is a curved timeline presented in a perspective view and, in this example, depicts a total time period of approximately 4 days.

Timeline 306 is divided into a number of time intervals 308, each of which represents a same time duration (in this particular case 1 hour). In this embodiment the start point of each interval (effectively the end point of the immediately preceding interval) is marked by an interval separator 310, each of which is marked with a time 312 indicating the start time represented by the interval 308. Each time interval 308 is represented by an interval line joining the interval separator 310 marking its start with the interval separator 310 marking the start of the next interval. In this example each interval represents 1 hour. Interval separators 310 allow for time intervals 308 to be visually distinguished from one another. Additional and/or alternative means of distinguishing intervals 308 from one another are, of course possible. For example, adjacent intervals 308 could be displayed in different colours, different line weights, and/or different line compositions (e.g. dashed lines, solid lines, dotted lines, dot-dash lines etc.). In alternative embodiments, intervals 308 need not be distinguished from one another and interval separators 310 need not be displayed.

Timeline 306 is also divided into a number of time segments 314. In this case each segment 314 represents a single day/24 hour period, providing four segments indicated respectively by brackets 314a, 314b, 314c, 314d over the length of the timeline 306, each segment including 24 intervals 308 (corresponding to the 24 hours of the day). Herein, length is used to refer to the physical length of a line displayed on a screen. Duration is used to refer to a time period.

Each time segment 314 extends between inflection points 316 of the timeline 306. In the illustrated example, the inflection points 316 are selected to correspond to the hour of 12 am, and accordingly the middle (or approximate middle) 317 of each segment 314 represents the hour of 12 pm. Segment 314a (depicting the first day of the period) extends between inflection points 316a and 316b; segment 314b (depicting the second day of the period) extends between inflection points 316b and 316c; segment 314c (depicting the third day of the period) extends between inflection points 316c and 316d; and segment 314d (depicting the fourth day of the period) extends between inflection points 316d and 316e.

Herein, the term "inflection point" refers to the points at which a timeline such as timeline 306 changes direction. For example, and looking at timeline 306 as it extends from the foreground 302 to the background 304, inflection point 316a occurs where the timeline 306 ceases to travel left and starts travelling right. Similarly, inflection point 316b occurs where the timeline 306 ceases to travel right and starts travelling left. In this manner, inflection points 316 are such that each segment 314 travels in a direction that is re-entrant relative to the direction travelled by the immediately preceding segment (i.e. successive segments 314 of the timeline 306 double back on each other).

Due to the perspective presentation of the timeline 306, although each segment 314 represents the same period of time (a day in this instance), each segment 314 is shorter than its preceding segment (i.e. the chronologically earlier segment appearing closer to the foreground 302 of the interface 300). Put conversely, each segment 314 is longer than its successive segment 314 (i.e. the chronologically later segment appearing closer to the background 304 of the interface 300). Segment 314a (representing the first period of the total timeline period) is longer than segment 314b (representing the second period of the total timeline period); segment 314b (representing the second period of the total timeline period) is longer than segment 314c (representing the third period of the total timeline period); and segment 314c (representing the third period of the total timeline period) is longer than segment 314d (representing the fourth period of the total timeline period). This provides chronologically earlier times on the timeline 306 with a visual precedence over chronologically later times on the timeline 306, which have the appearance of disappearing towards a vanishing point (e.g. a horizon).

Interface 300 also includes various calendar items 318 that are associated with times or time periods relevant to the timeline 306 (i.e. occurring within the total period displayed by the timeline 306). Calendar items 318 can include any item with an associated time/time period, such as scheduled events, meetings, reminders, and tasks.

In this particular embodiment, each calendar item 318 is presented with a label 320 (including a description of the relevant item 318) and a timing indicator 322 indicating the time on the timeline 306 that the calendar item 318 commences. In this case the timing indicator 322 is an arrow pointing to the point on the timeline 306 corresponding to the start time of the calendar item 318.

In addition to displaying a label 320 and timing indicator 322 for each calendar item 318, where a calendar item 320 relates to a period of time interface 300 also modifies the appearance of the timeline 306 to indicate that period. In the example depicted in FIG. 2, time intervals 308 (or parts thereof) associated with calendar items 318 are shown with thicker lines 324 than timeline intervals 308 (or parts thereof) that are not associated with calendar items. Alternative means of visually distinguishing time intervals 308 (or parts thereof) associated with calendar items 318 from time intervals 308 or parts thereof not associated with calendar items 318 are, of course possible (e.g. based on colour, line weight, line composition, or other visual indicators). Further, interface 300 may be configured such that different calendar items 318 are thematically differentiated from one another. For example, a label 320, timing indicator 322, and associated timeline interval 324 associated with a first calendar item 318 may be all displayed with a first visual theme (e.g. a first colour), while a label 320, timing indicator 322, and associated timeline interval 324 associated with a second calendar item 318 may be all displayed with a second visual theme (e.g. a second colour)—the second visual theme being visually distinguishable from the first visual theme.

Where the labels 320 of two calendar items 318 overlap (e.g. as is the case with labels 320a and 320b), the interface will as a default display the label 320a relating to the chronologically earlier calendar item atop the label 320b relating to the chronologically later calendar item. Further, where time periods associated with two or more calendar items 318 overlap (e.g. one calendar item relates to a meeting between 2 and 3 pm on a particular day and a second calendar item relates to a meeting between 2 and 4 on that same day) the interface may be configured to visually indicate a conflict between the overlapping items, for example by indicating the overlapping time periods and/or calendar items 320 (or associated timeline intervals) in a particular colour (e.g. red), flashing the calendar items 320/associated time line intervals on/off, or employing alternative visual, audio, or haptic alerts.

As noted above, in the present example the inflection points 316 of the timeline 306 are selected to correspond to the hour of 12 am, and the middle (or approximate middle) of each segment 314 corresponds to the hour of 12 pm. Further, due to the manner in which the curved timeline 306 is generated (discussed below), for a given segment 314 the closer an interval 308 is to the middle of that segment 314 the longer its physical length. Put conversely, for a given segment the closer an interval 308 is to the end (inflection point 316) of that segment 314 the shorter the physical length of the interval 308. Accordingly, although each interval 314 represents the same duration of time (in this case 1 hour) the length of the interval as displayed on the screen varies. This, combined with setting segments 314 to correspond to 24 hour periods running from midnight to midnight, results in those timeline intervals 308 which correspond to periods near the middle of the day (which for many people will be the hours that are more likely to be associated with calendar items) being positioned closer to the middle of a given segment 314 (i.e. midday) and having a relatively long displayed length. Conversely, time intervals 308 which correspond to typical sleeping hours are displayed closer to the ends/inflection points 316 of a given segment (i.e. midnight), and have a relatively short displayed length. Alternatively, people with more calendar items occurring in the night hours (e.g. night shift workers) may configure the calendar interface such that segments 314 run from midday to midday—in which case the intervals representing hours falling closer to midnight (i.e. the middle of a given segment 314) will have a greater length than the intervals representing hours falling closer to midday (i.e. the ends of the segment 314).

By presenting the timeline 306 and associated calendar items 318 in this manner, a user can readily view and intuitively understand the calendar information, including identifying upcoming events, busy time periods, and blocks of availability.

Calendar Interface Generation

Figure 4:
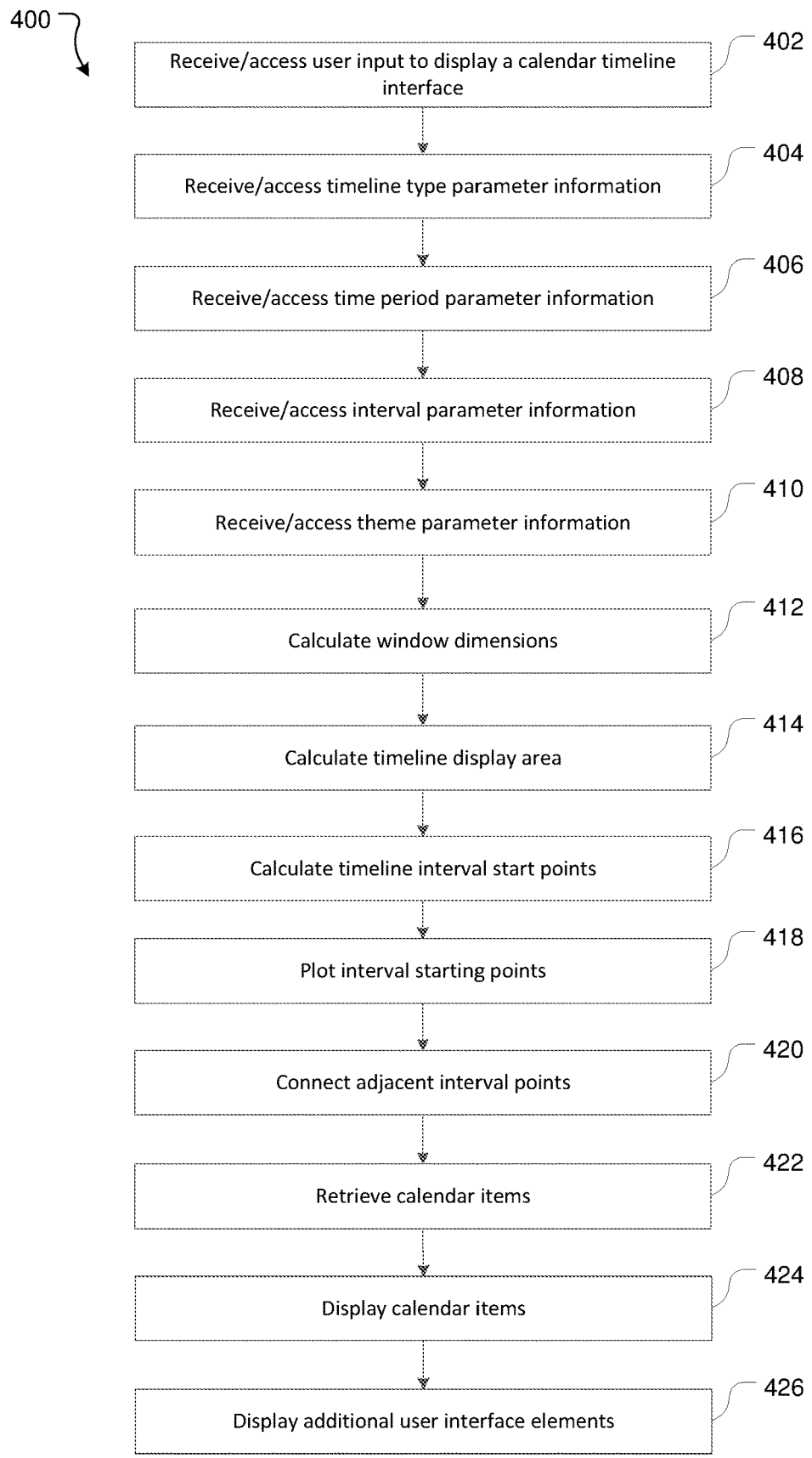
FIG. 4 is a flowchart that illustrates a method for generating a calendar interface.

Referring to FIG. 4, a computer implemented method 400 for generating a calendar interface such as interface 300 is depicted. Method 400 is implemented by a computer-processing unit 102 of a computer processing system, such as device 200. The computer-processing unit 102 is configured to perform method 400 by use of computer readable instructions and data (i.e. software) stored in memory accessible by the computer-processing unit 102 (such as non-transient memory 110). In this case device 200 displays information to the user on touchscreen display 200 and user input is received from inputs made by the user either entering information on the touch screen display 202, physical buttons 204, or a combination of both.

At 402 the electronic device 200 receives a user input to display a calendar interface.

Device 200 is configured to generate and display the calendar interface in light of a number of calendar interface parameters. Calendar interface parameters may be received as input from the user, default values, or automatically determined (e.g. based on other user input(s), default settings, and/or other data). In this embodiment the calendar interface parameters include: a timeline type parameter, time period parameters (including a start date parameter and a total time period parameter), an interval value parameter, and a calendar theme parameter.

At 404 the device 200 receives or accesses a timeline type parameter input. The timeline type parameter determines the form of the timeline that will be displayed in the calendar interface (e.g. a curved timeline such as that depicted in FIG. 3, a straight-segment timeline such as that depicted in FIG. 6, or an alternative type of timeline).

At step 406 the device 400 receives or accesses time period parameters. The time period parameters include a starting date parameter (i.e. a date and time at which the timeline is to start) and a total time period parameter indicating the total time period to be represented by the timeline 306. For example, the total time period may be set to be a day, a week, a month or a year or any other predefined value. As will be appreciated, time period parameters may be input by a user in a variety of ways. Device 200 may prompt the user to enter a start date and an end date (the total time period parameter then being calculated as the intervening period). Alternatively, the device 200 may prompt the user to directly enter a start date and a total time period to be displayed. Further alternatively, the device 200 may be programmed to access a current date and display a predetermined time period from the current date (e.g. a day, a week, a fortnight, a month etc.).

At 408 the device 200 receives or accesses an interval value parameter input. The interval value parameter indicates the duration that each interval on the timeline is to represent. In some cases the device 200 may be configured to default to interval durations of 1 hour. In some cases device 200 may be configured to automatically determine an appropriate interval value based on the total time period. For example if the user selects a week or less as the total time period, device 200 may automatically select an interval value of one hour. Alternatively, if the total time period is a month, device 200 may select an interval value of one day. Any appropriate interval value may be used—e.g. 5 minutes, 10 minutes, 15 minutes, 30 minutes, 1 hour, 2 hours, 3 hours, 4 hours, 5 hours, 6 hours etc.

At 410 the device 200 receives or acceses a theme parameter input. The theme parameter dictates how one or more visual elements of the interface will be displayed. This is described below with respect to FIG. 9.

In order to receive the various calendar interface parameters the device 200 may be configured to provide the user with a series of prompts, each prompt requesting the user to input the relevant parameter information (e.g. by entry in a text box, selection from a list of items or the like). Alternatively, device 200 may be configured to display a single calendar configuration screen in which the user inputs the relevant information.

In some embodiments device 200 may be configured to present one or more default parameter values to the user who can then accept or change those values. Default values may be based (for example) on parameter values selected by the user in the previously generated calendar, parameter values most often selected by the user, or typical parameter values.

In some embodiments device 200 may store one or more user defined profiles that include sets of parameter values previously entered by the user. In this case instead of a prompting a user to select individual parameter values (e.g. at 404, 406, 408, and 410) device 200 may prompt the user to select the desired profile and use the parameter values from that profile. In this case device 200 will also provide a user with the option of creating a new profile or modifying an existing profile. Device 200 may also provide a user with the option of importing profiles.

In addition to user-defined profiles, device 200 may also store one or more standard profiles selectable by a user. For example, device 200 may offer a "current working week" standard profile having the following parameters: timeline type: curved; total time period: 5 days (commencing, if generated on a Monday, on the current day otherwise commencing on the last Monday); interval: 1 hour; theme: native. Device 200 may also offer a "next working week" standard profile having the following parameters: timeline type: curved; total time period: 5 days (commencing on the next occurring Monday); interval: 1 hour; theme: native.

At 412 to 426 the device 200 generates and displays a calendar interface in accordance with the calendar interface parameters. It will be appreciated that a calendar interface according to the principles of the present invention could be generated in a variety of ways.

Generation of a calendar interface with a curved timeline in accordance with one embodiment will be described with further reference to FIGS. 5A, 5B, and 5C.

At 412, device 200 calculates the dimensions of the window in which the calendar interface will be displayed. FIG. 5A shows a development view of such a window 500. Window 500 has a total available display area 502 defined by a total available display area height 502$h$ and a total available display area width 502$w$. The total available display area 502 may be the total size of the display (such as touchscreen 202) or, if the calendar interface is to be displayed within a window that occupies only part of the display 202, the size of that window.

At 414, device 200 calculates the area and dimensions within the window in which the main timeline will be displayed. This area will be referred to as the timeline display area 504, having a timeline display area width 504$w$ and a timeline display area height 504$h$. The timeline display area 504 need not be visually distinguished from the window display area 502.

Within window 500 device 200 may set margins 506 (e.g. a bottom margin 506$b$, a top margin 506$t$, a left margin 506$l$, and/or a right margin 506$r$). These margins 506 can be used to offset the main timeline from the extents of the window 500, making for a more usable interface. The margins 506 may also be used to display additional information and/or user interface elements. For example, in window 500, timeline labels extend into the right margin 506$r$, a leading timeline period (representing time before the actual time period requested by the user) extends into the bottom margin 506$b$, and a trailing timeline period (representing time after the actual time period requested by the user) extends into the top margin 506$t$. The width of the timeline display area 504$w$ is calculated by subtracting the left margin 506l width and the right margin 506$r$ width from the total available display area width 502$w$. The height of the timeline display area 504$h$ is calculated by subtracting the bottom margin 506$b$ height and the top margin 506$t$ height from the total available display area height 502$h$.

If no information/user interface elements need to be displayed outside the timeline display area 504 (and there are no aesthetic/usability reasons to offset the timeline display area 504 from the extents of the window 500 in which the interface is to be displayed) one or more of the margins 506 may be set to have a 0 width/height).

The flowchart illustrated and described with respect to FIG. 4 provides steps in a particular order to explain various features of a method for generating a calendar interface. In some cases the steps may be able to be performed in a different order, one or more steps may be combined into a single step, a single step may be divided into multiple separate steps, and/or the function(s) achieved by one or more described/illustrated steps may be achieved by one or more alternative steps.

Curved Timeline Generation

At 416 to 420, the device 200 generates the timeline 306 for display in the timeline display area 504.

In the present embodiment, timelines are generated by being graphed on a logical grid having a horizontal (x) axis (corresponding to the width dimension of the display area) and vertical (y) axis (corresponding to the height dimension of the display area). Curved timelines in this embodiment are based on a sinusoidal equation. In its simplest form, the sine function is defined by y=sin x, where x is an angle between 0 and 360 degrees and y is a value between −1 and 1. From this base equation each point needed to represent the timeline 306 (or, specifically, intervals 308 of the timeline 306) is calculated The coordinates of the timeline intervals are calculated with reference to the calendar interface parameters (e.g. the start date parameter, total time period parameter, and interval value parameter), the width and height of the total timeline display area, and additional parameters as discussed below.

As described, a timeline such as timeline 306 is made up of a series of intervals 308 and a series of segments 314. In order to generate the timeline, x and y coordinates of the start points of each interval are determined.

The relevant parameters for determining the x/y coordinates of each interval (and, in fact any given point on the timeline) are, in the present example, as follows:

height: the timeline display area height 504*h*. Device 200 is configured to calculate the height by subtracting the widths of any desired bottom margin 506*b* and top margin 506*t* from the total available display area height 502*h*.

width: the timeline display area width 504*w*. Device 200 is configured to calculate the width by subtracting the widths of any desired left margin 506*l* and right margin 506*r* from the total available display area width 502*w*. The timeline display area width 504 defines the maximum amplitude (or horizontal extents) of the timeline to be generated.

total_time_period: the total time period to be displayed by the timeline (as per the total time period parameter).

interval_duration: the time period to be represented by each interval of the timeline (as per the time interval parameter).

segment_duration: the time period to be represented by each segment of the timeline. The segment_duration value is either a pre-determined constant value or is calculated according to other parameters (e.g. the total_time_period and/or the interval_duration). In the embodiments of FIGS. 3, 5, 6, 7, and 8, the segment_duration is 24 hours, such that each timeline segment represents a single day (i.e. 00:01 am to 24:00 of a given date). In the embodiment of FIG. 9 the segment_duration is 168 hours, such that each timeline segment represents a week.

segment_degrees: the number of degrees that each segment will occupy. The segment_degrees value is a pre-determined constant value or calculated according to other parameters. Typically, and in the embodiments described herein, the segment_degrees is a constant having a value of 180 degrees (i.e. half of a sine wave cycle).

intervals_per_segment: the total number of intervals to be displayed per segment. Device 200 is configured to calculate the intervals_per_segment by dividing the segment duration by the interval duration:

intervals_per_segment=segment_duration/interval_duration [Equation 1]

In this case 24 intervals per segment are to be shown (i.e. such that each segment corresponds to a day). The intervals_per_segment parameter may be calculated once and stored by device 200 in memory for reference as required, or may be calculated each time it is needed.

total_intervals: the total number of intervals to be displayed. Device 200 is configured to calculate the total_intervals by dividing the total time period by the interval duration:

total_intervals=total_time/interval_duration [Equation 2]

For example, if the total time period is 4 days (96 hours) and the interval duration is 1 hour, then the total number of intervals is 96 (96/1). The total_intervals parameter may be calculated once and stored by device 200 in memory for reference as required, or may be calculated each time it is needed.

starting_point: the value that configures the timeline to start at a desired point in the sine curve cycle. In the present embodiment the device 200 is configured to start the timeline at the left hand side of the timeline display area 506 and initially move right. To achieve this system 200 uses a starting_point value of 270 degrees. Alternatively, the starting_point value could be set so the timeline: starts on the right hand side of the timeline display area 506 and initially moves left (starting_point=90 degrees); starts at the centre of the timeline display area 506 and initially moves left (starting_point=180 degrees); starts at the centre of the timeline display area 506 and initially moves right (starting_point=0 degrees). Further alternatively, a starting_point value may be selected/calculated to make the timeline start at any desired position and move either left or right. This is useful when displaying and aligning multiple timelines as described further below.

xscale: a scaling factor for the x-coordinate applied to provide the timeline with a perspective appearance. The x coordinate scaling factor is a percentage indicating the percentage of the timeline display area width that the timeline is to be scaled by over its length. For example, an xscale factor of 10% indicates that over the length of the timeline it is to be scaled by 10% (i.e. such that at its end the timeline occupies 90% of the timeline display area width). Applying the xscale percentage results in the amplitude of the timeline progressively reducing along its length: i.e. the amplitude of the timeline gets shorter as the timeline moves from the bottom of the display (i.e. the foreground) towards the top of the display area (i.e. the background).

Device 200 is configured to select or calculate the xscale percentage according to the number of segments to be shown in the timeline. For example, if the timeline will consist of a single segment, an xscale percentage of 0% may be used. Alternatively, if the timeline will consist of 4 segments an xscale percentage of 20% may be appropriate. Alternative values could of course be used.

At 416, and using the above parameters, device 200 calculates the x and y coordinates of the start point of each interval n according to the equations:

$$x_n=(0.5*width)*\sin(starting\_point+((1-n)*(segment\_degrees/intervals\_per\_segment)))*(1-(n*(xscale/total\_intervals)))$$ [Equation 3]

$$y_n=(n-1)*(height/(total\_intervals-1))$$ [Equation 4]

At 418, the device 200 plots the interval starting points onto the timeline display area 504.

At 420, the device joins adjacent interval starting points with lines to display a continuous timeline.

Figure 5A:
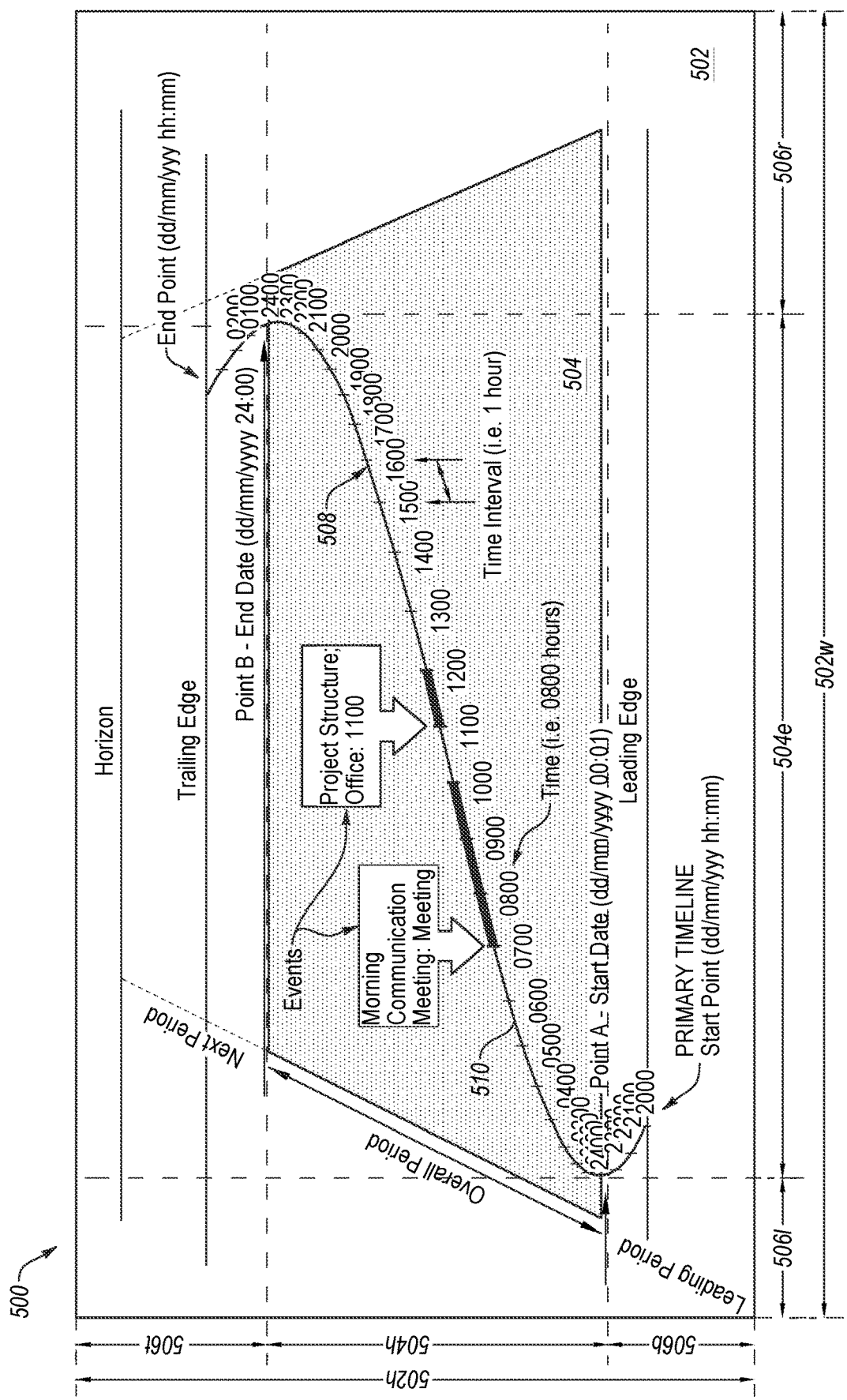
FIGS. 5A, 5B and 5C show development views re the generation of a curved timeline calendar interface.
Figure 5B:
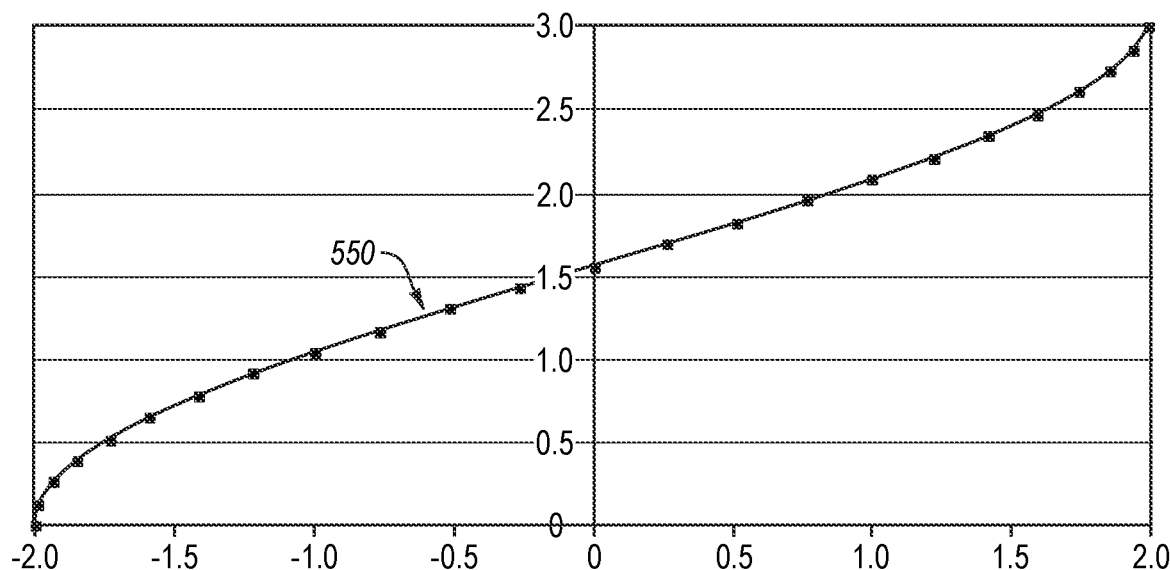

FIG. 5B depicts a timeline 550 (in development view, with axes shown) generated according to equations 3 and 4 above and the following parameters:

height=3
width=4
total_time_period=24 hours
interval_duration=1 hour segment_duration=24
intervals_per_segment=24
starting_point=270 degrees
segment_degrees=180 degrees
total_intervals=24
xscale=0%

Figure 5C:
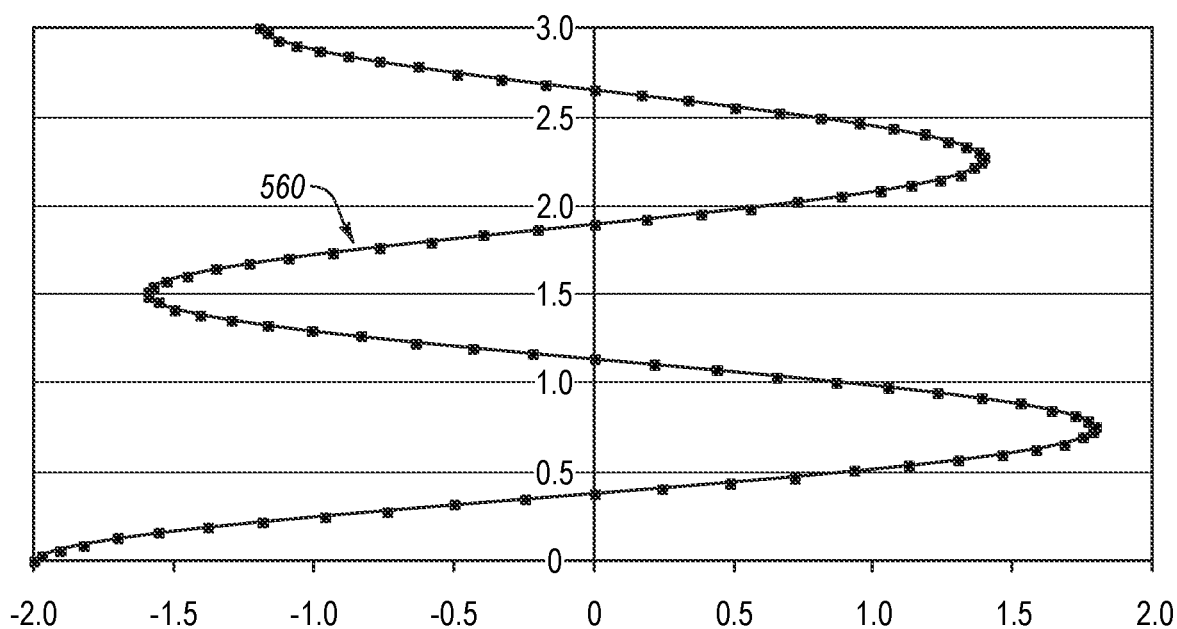

FIG. 5C depicts a timeline 560 (in development view, with axes shown) generated according to the same parameters as timeline 550 of FIG. 5B, with the exception that a total time period of 96 hours (i.e. 4 days, leading to 96 total intervals and 4 segments) is shown, and an xscale value of 40% is used.

Retrieve and Display Calendar Items

At 422, device 200 is configured to retrieve or access the calendar items 318 to be displayed on/in relation to the timeline.

Calendar items 318 may be stored in and retrieved by device 200 from any appropriate calendar data structure (e.g. a relational database, table, spread sheet, or other data structure) accessible by system 200. The calendar data structure may be stored in a memory physically integrated with the device 200 (e.g. non-transient memory 110), or may be stored on a memory remote from the device 200 (e.g. a calendar data structure stored on a remote server an accessible via a network 118). The calendar data structure may be built specifically for use with the present calendar interface application, or may be an existing calendar program, for example Microsoft Outlook, Google Calendar or another calendar program, in which case calendar items 114 are retrieved using appropriate API calls to the calendar program.

Calendar items 114 are retrieved from the relevant data structure by reference to the dates represented by the timeline. For example, if the starting date of the timeline is 1 June 20xx, and the total time period to be represented by the timeline is four days, then the calendar data structure is queried to return calendar events from the data structure which are associated with times between 00:01 on 1 June 20xx to 24:00 on 4 June 20xx.

In some embodiments, device 200 can also be configured to apply filters selected by the user. For example, and by way of general example, a user may tag calendar items with a category (work, personal) and then select to only view personal items. In this case, device 200 configures the calendar data structure to only retrieve calendar items tagged "personal" (and falling within the relevant time period) from the calendar data structure.

At 424, device 200 displays the retrieved calendar items 318. Each calendar item 318 is associated with a start time and date and an end time and date. For some items the start and end date may be the same. The start and end time/dates may be stored as such, or may be calculated from a start time/date and calendar item duration.

For each calendar item 318, the device 200 is configured to calculate the timeline positions corresponding to the start time and date and end time and date of the calendar item. This is done, in the present embodiment, by calculating the interval value for the start/end time/dates and using equations 3 and 4 above to determine the relevant x and y coordinates for those interval values.

For example, if the starting point of the timeline is 1 June 20xx 00:01 am, and the intervals of the timeline represent 1 hour periods, then: a calendar item having a start date of 1 June 20xx 09:00 and an end date of 1 June 20xx 10:30 will have a start interval value of 10 (representing 09:00 on the timeline) and an end interval value of 11.5 (representing 10:30 on the timeline).

Once the start and end interval values for the calendar item have been calculated, the associated x and y coordinates for those interval values are calculated using equations 3 and 4 above: i.e. the x and y coordinates with n equal to the calendar item start point (in this case n=10) and the x and y coordinates with n equal to the calendar item end point (in this case n=11.5).

Once the x and y coordinates for the start/end of the calendar item have been calculated, device 200 uses those coordinates to display that calendar item as desired. For example, and as per the example shown in FIG. 3, device 200 may be configured to display the calendar item by: positioning a label 320 with information describing the item (retrieved as part of the calendar item information from the calendar data structure) above the timeline; positioning a timing indicator 322 so as to point to the starting position of the calendar item on the timeline; modify the appearance of the timeline between the start and end points of the calendar item (e.g. by displaying the timeline in a thicker line, a different colour, or a different line composition).

This is repeated for all retrieved calendar items.

Additional User Interface Elements

At 426 the device 200 is configured to display additional user interface elements. Such elements may be information elements displaying information and which a user does not interact with, or interaction elements (e.g. buttons and the like) that a user can interact with to perform various functions. By way of non-limiting example, user interface elements may include the following:

A title for the calendar interface.

The current date and time as determined according to a system clock. This may be displayed in a text box or similar, or by a graphic displayed on the timeline itself (if the timeline covers the current date).

Interval labels indicating the time represented by each interval (such as times 312 shown in FIG. 3A).

One or more controls for changing the time period displayed by the timeline.

General reference lines to assist in determining the time represented by the timeline (such as reference lines 752 described below in relation to FIG. 7B).

A user adjustable reference line (such as reference lines 754 described below in relation to FIG. 7B).

A "display all events/display reference line events" toggle control (such as control 756 described below in relation to FIG. 7B).

Leading and/or trailing timeline periods (as depicted in FIG. 5A).

Any theme related graphics (as described in relation to FIG. 9).

Zoom controls, to allow the user to zoom in/out of the calendar interface to more easily view crowded periods of the timeline—e.g. where many calendar items occur at the same/near same time, and/or where calendar items occur near the inflection points and are more closely grouped. In the case of a touch screen device, rather than displaying specific zoom controls (such as a + and a − control) device 200 may allow for zooming in by a de-pinch gesture and zoom out by a pinch gesture.

Pan controls, to allow the user to pan (particularly when zoomed in). Once again, pan controls could be displayed controls (such as arrow buttons) or non-displayed controls invoked by gestures on the touch screen display.

An "eye-height" control, allowing the user to set a virtual eye height (e.g. low, middle, high, or otherwise specified) at which the timeline is generated. A "low" eye-height implies that the virtual eye level is closer to the ground, and as such the segments of the timeline will be generated so as to appear to spread out away from the user (i.e. from the foreground to the background). In contrast, a "high" eye-height implies that the virtual eye level is directly above (or approaching directly above) the timeline, in which case the timeline is generated so as to take this appearance.

Straight-Segment Timeline

Figure 6A:
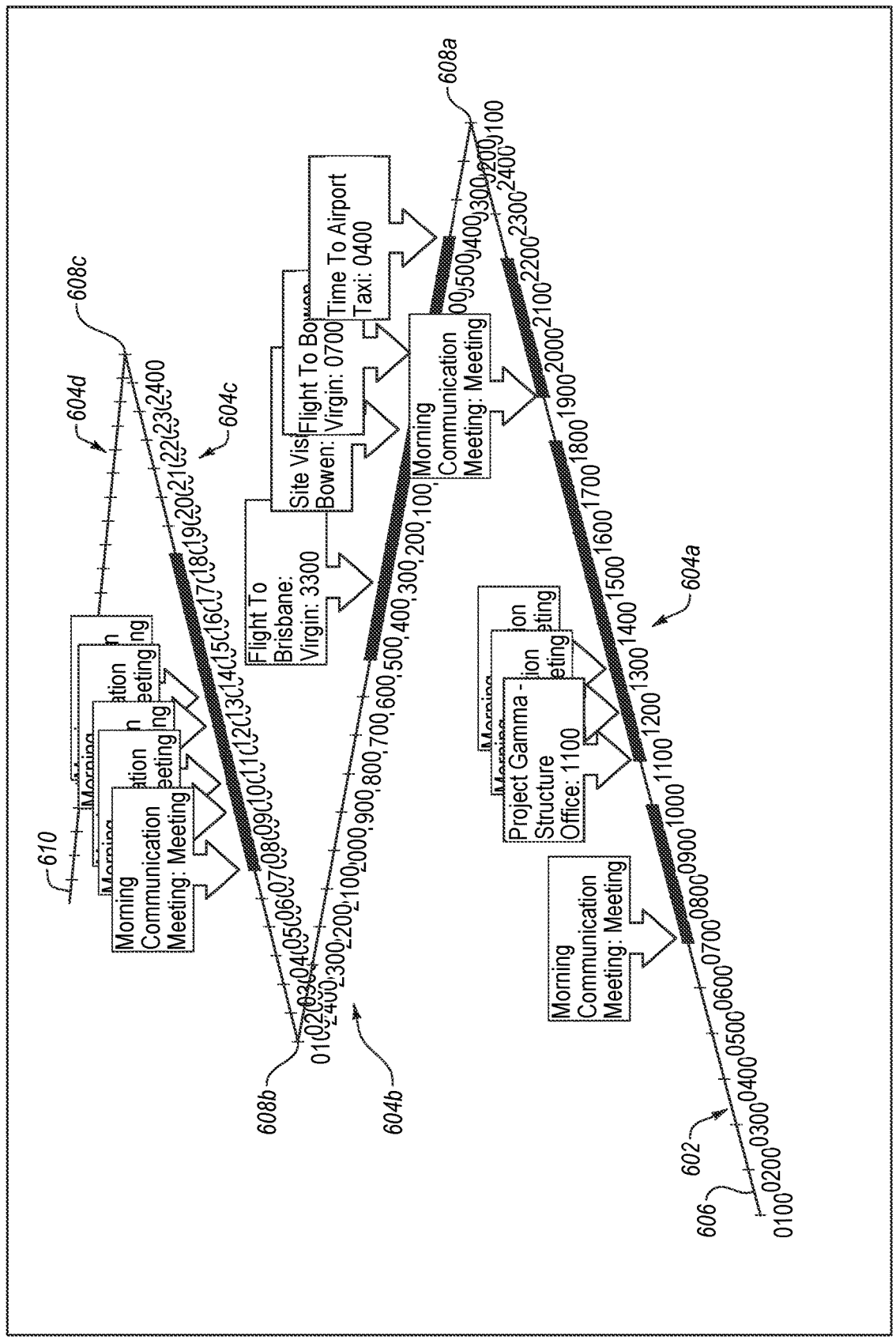
FIG. 6A is an example calendar interface showing a straight-segment timeline.

Referring to FIG. 6A, an alternative embodiment of a timeline 602 is depicted. Timeline 602 shares the features of timeline 308 described above, however is presented as having straight line segments 604a-d rather than being curved. In the embodiment depicted the intervals 606 of a given segment 604 have the same length (though due to the perspective presentation of the timeline intervals 606 of later occurring segments are shorter than intervals 606 of earlier occurring segments). In alternative embodiments, however, interval lengths could be calculated/generated such that intervals occurring closer to the middle of a given timeline segment have a longer length than intervals occurring closer to the ends of that timeline segment (as per the intervals of the curved timeline described above). Each segment of the timeline 602 travels in a direction that is re-entrant relative to the direction travelled by the immediately preceding segment.

Specifically, straight-segment timeline 602 includes: straight line segment 604a (extending between start point 606 and inflection point 608a); straight line segment 604b (extending between inflection point 608a and inflection point 608b, and which is re-entrant relative to segment 604a); straight line segment 604c (extending between inflection point 608b and inflection point 608c and which is re-entrant relative to segment 604b); and straight line segment 604d (extending between inflection point 608c and end point 610 and which is re-entrant relative to segment 604c).

While, in the present embodiment, generation of a straight-segment timeline such as 602 uses most of the same parameters as used to generate the curved timeline described above, the actual manner in which the timeline is generated differs. The relevant parameters for this embodiment are:

height: the timeline display area height (as described above).

width: the timeline display area width (as described above).

total_time_period: the total time period to be displayed by the timeline (as described above).

interval_duration: the time period to be represented by each interval of the timeline (as described above).

segment_duration: the time period to be represented by each segment of the timeline (as described above).

number_intervals_per_segment: the total number of intervals per segment. This may be calculated according to: segment_duration/interval_duration.

starting_point: the value that configures the timeline to start at a desired point (as described above).

xscale: a scaling factor for the x-coordinate applied to provide the timeline with a perspective appearance (as described above).

Control Points

In the present embodiment, in order to generate a straight-segment timeline, device 200 first calculates the positions of the timeline control_points. The timeline control points include the start point 606 of the timeline, any inflection points (e.g. 608a, 608b, and 608c in the example of FIG. 6), and the end point 610 of the timeline. As described below, device 200 may be configured to calculate the coordinates of the timeline control points in a number of ways.

For example, device 200 may calculate the x and y coordinates of a given control point n (where control point 1 [n=1] is the start point of the timeline, control point n is the end point of the timeline, and intervening values of n are inflection control points) according to the following equations:

$$x \text{ coordinate of control point } n=(0.5*\text{width})*\sin(\text{starting\_point}+(180*(n-1)))*(1-((n-1)*(x\text{scale}/(\text{total\_time\_period}/\text{segment\_duration})))) \quad \text{[Equation 5]}$$

$$y \text{ coordinate of control point } n=(n-1)*(\text{height}/((\text{total\_time\_period}/\text{segment\_duration}))) \quad \text{[Equation 6]}$$

Figure 6B:
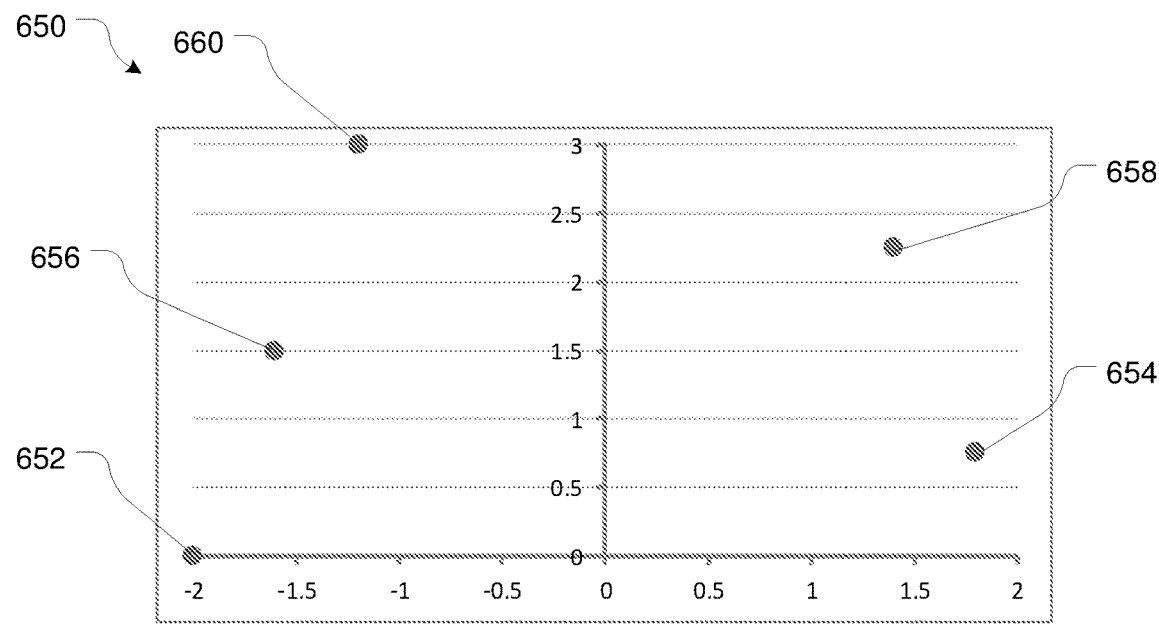

FIG. 6B depicts a development view 650 showing control points (start point 652, inflection points 654, 656, and 658, and end point 660) plotted according to equations 5 and 6 and the following parameters:

height=3
width=4
total_time_period=96 hours (4 days)
segment_duration=24 hours
starting_point=270 degrees
xscale=40%

The actual control point coordinates shown in FIG. 6B are as follows:

| Control point | x coordinate | y coordinate |
| --- | --- | --- |
| n = 1 (start point 652) | −2 | 0 |
| n = 2 (inflection point 654) | 1.8 | 0.75 |
| n = 3 (inflection point 656) | −1.6 | 1.5 |
| n = 4 (inflection point 658) | 1.4 | 2.25 |
| n = 5 (end point 660) | −1.2 | 3 |

Alternatively, device 200 may maintain a reference table (or other data structure) of predetermined control point coordinates applicable to certain calendar interface parameters. For example, device 200 may store one or more of background images (photographs, drawings, etc.) on which timelines can be displayed. For each image device 200 stores information on both the number of timeline segments that the image is appropriate for and the coordinates of control points for that image. When a calendar interface with x segments is to be generated, device 200 may retrieve an image appropriate for an x-segment timeline together with the control points coordinates for that image.

Figure 6C:
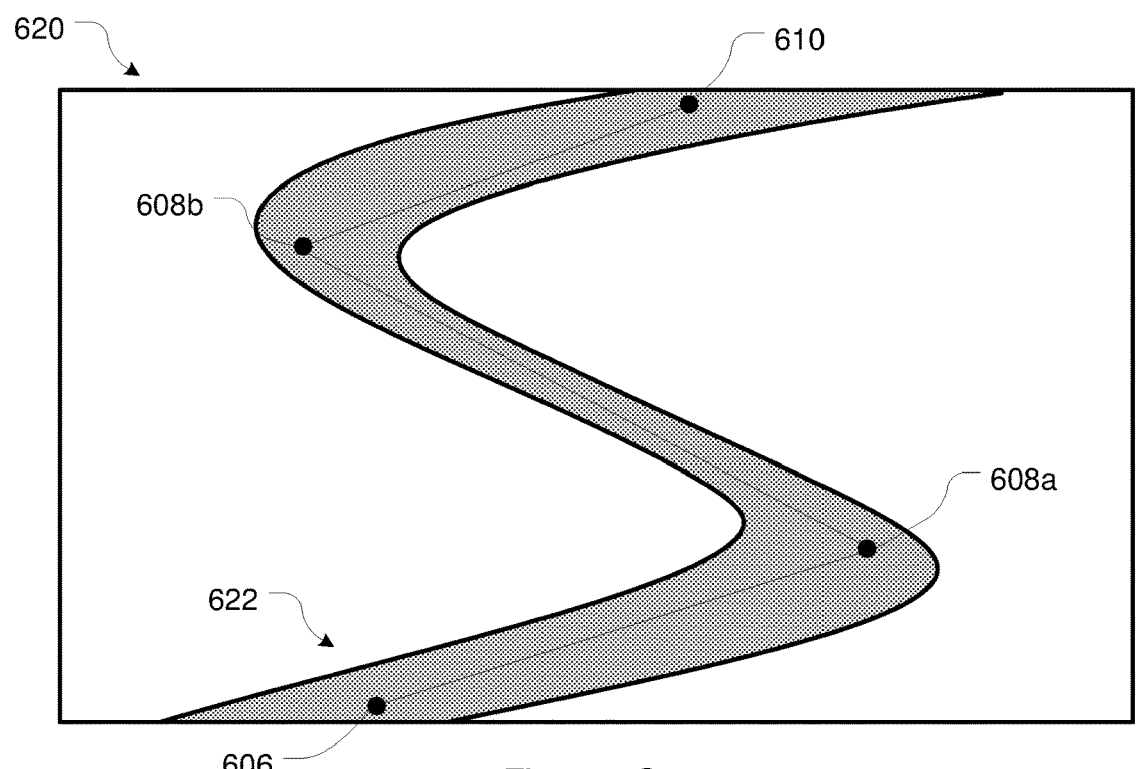

By way of example, development view 620 of FIG. 6C depicts an image 620 of a road 622 (in reality this could, for example, be a photograph of a road, track, river, or any other scene having a path on which a timeline can be displayed). Road 622 has two points of inflection, making it suitable for displaying a timeline with three segments (each straight or relatively straight road portion being suitable for a timeline segment). Device 200 stores this information, together with coordinates of appropriate control points for the image 620—e.g. start point 606, inflection points 608a and 608b, and end point 610. For a given image such as 620, control points may be manually selected by a user (e.g. by contacting/clicking on the image at the appropriate positions in a control point selection) and saved in relation to the image. Alternatively, control point positions may be automatically calculated by use of image processing techniques and algorithms which analyse a given image to detect the path displayed and, based on the detected path determine appropriate start, end, and inflection points.

Further, device 200 may be configured to allow control point positions to be adjusted by a user. This is depicted in FIG. 6D which shows a development view 640 with timeline 642 and control points 644 (start point), 646*a*, 646*b*, 646*c* (inflection points), and 648 (end point). FIG. 6D depicts the adjustment of control point 646*b* from its original position to a new position, 646*b*'. This adjustment is achieved by a user dragging the control point 646 from its original location to its new location (e.g. by touch contact or interaction with a pointing device such as a mouse). As can be seen, adjustment of the control point location also results in the associated timeline segments being adjusted.

Timeline Segments

Once control point coordinates for the timeline have been determined, segments 604 are generated by determining the equation of a straight line joining adjacent control points. Generally speaking, the equation of a line joining a control point with coordinates (x1, y1) and a control point with coordinates (x2, y2) is determined, e.g. according to: $y=y1+((y2-y1)/(x2-x1))*(x-x1)$.

Once the equation of the line between two adjacent control points has been calculated, the line can be plotted between those two control points.

Additionally, device 200 calculates the length of each timeline segment (segment_length). Generally speaking, the length of a straight line joining a control point with coordinates (x1, y1) and a control point with coordinates (x2, y2) can be determined, e.g. according to: $segment\_length = sqrt((x2-x1)^2+(y2-y1)^2)$.

Timeline Intervals

The segment length is used to calculate the physical length of each interval on that segment. Where each interval of a given segment is to have the same length (as depicted in FIG. 6A) this length can be calculated as: length of each interval on the segment=segment length/(segment_duration/interval_duration).

If intervals are to be provided with differing lengths, alternative calculations can be made to determine the length of each interval. As one example, the length of a given interval n may be calculated by:

Using a sine wave function to calculate a proportional interval length of each interval n:

$$proportional\_interval\_length = sin(n*(180/(number\_intervals\_per\_segment)+1)))$$  [Equation 7]

and using the proportional interval length (and the total sum of all proportional interval lengths) to determine the actual interval length with respect to a given segment length $$actual\_interval\_length(n) = proportional\_segment\_length(n)*(segment\_length/sum(proportional\_interval\_lengths))$$  [Equation 8]

By way of example, the following table provides interval lengths (calculated in accordance with equations 7 and 8) for a segment of 100 units being divided into 6 intervals:

| Interval | Length |
| --- | --- |
| 1 | 9.903113 |
| 2 | 17.84479 |
| 3 | 22.25209 |
| 4 | 22.25209 |
| 5 | 17.84479 |
| 6 | 9.903113 |
| Total | 100 |

Having calculated the interval lengths for a given segment, interval start points can then be plotted along the segment line. As will be appreciated, selecting/configuring control points and generating a timeline between those control points as described above allows timelines to be generated on a wide variety of images. This allows users to customise the calendar interface by selecting from various pre-provided images (with preconfigured control points), or by providing their own images and generating control images for those images.

Multiple Timelines

Figure 7A:
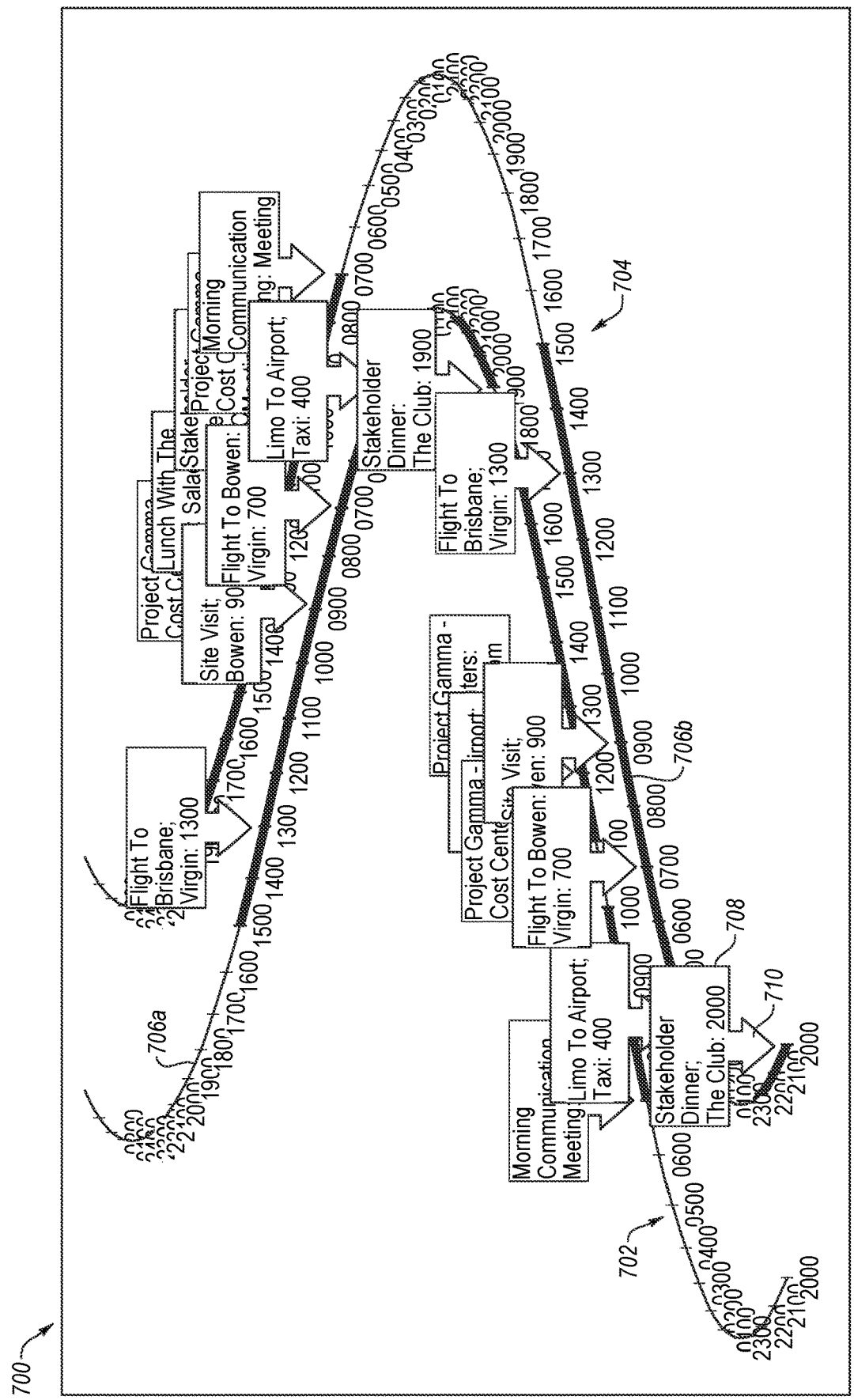
FIGS. 7A and 7B are example calendar interfaces showing multiple time lines in the same time zone.
Figure 7B:
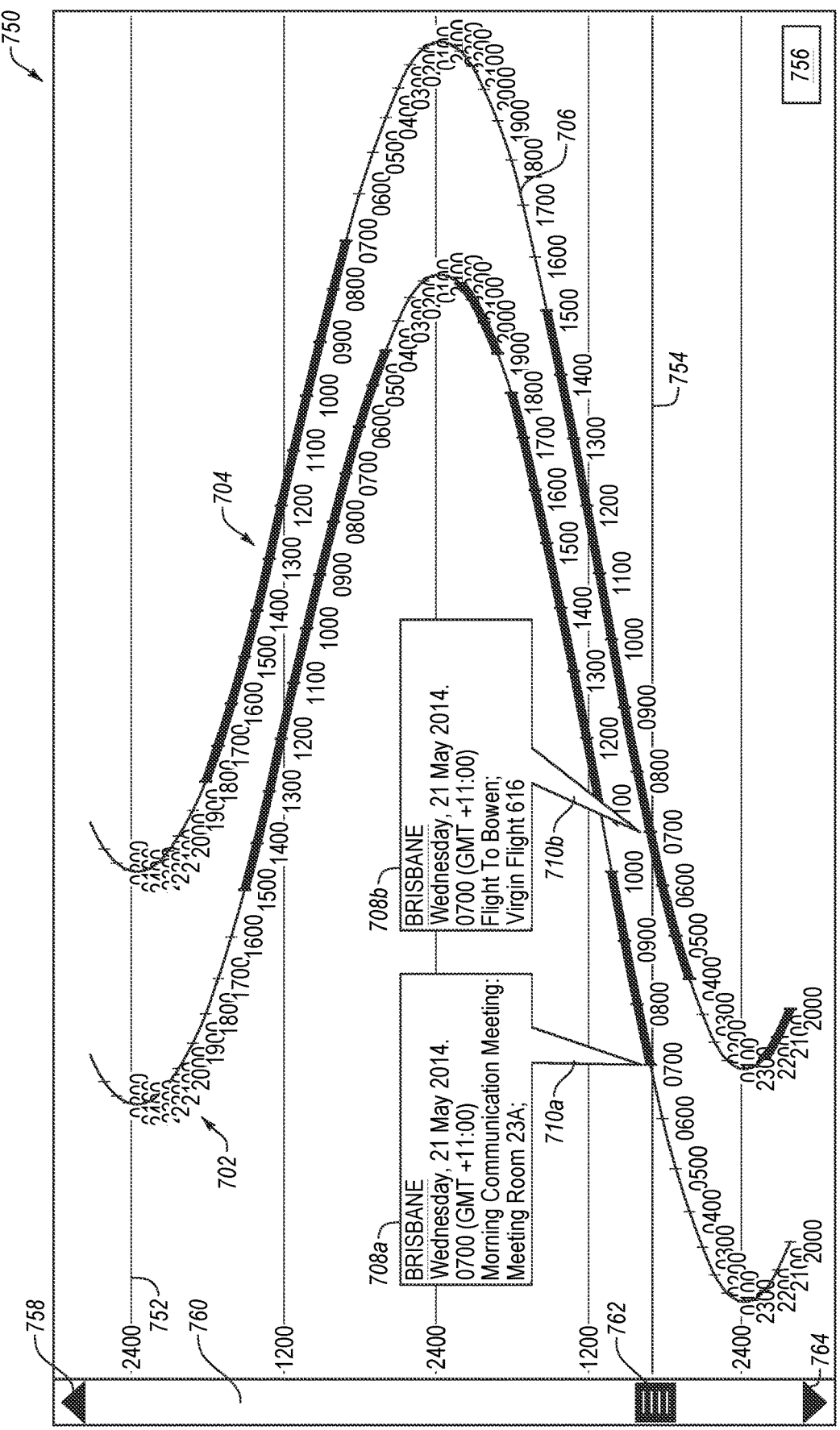
Figure 7C:
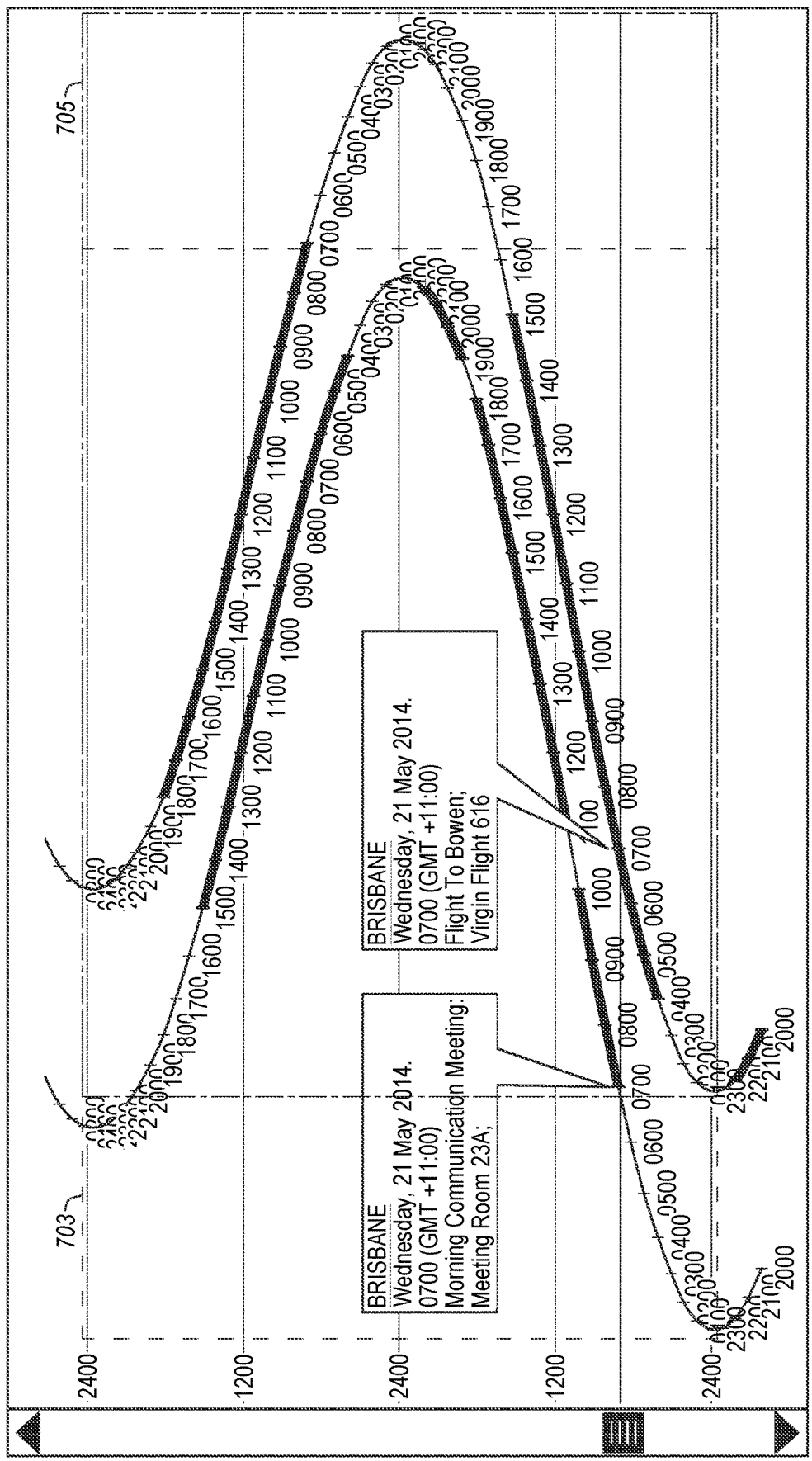
FIG. 7C is a development view of the calendar interface of FIG. 7B.
Figure 8:
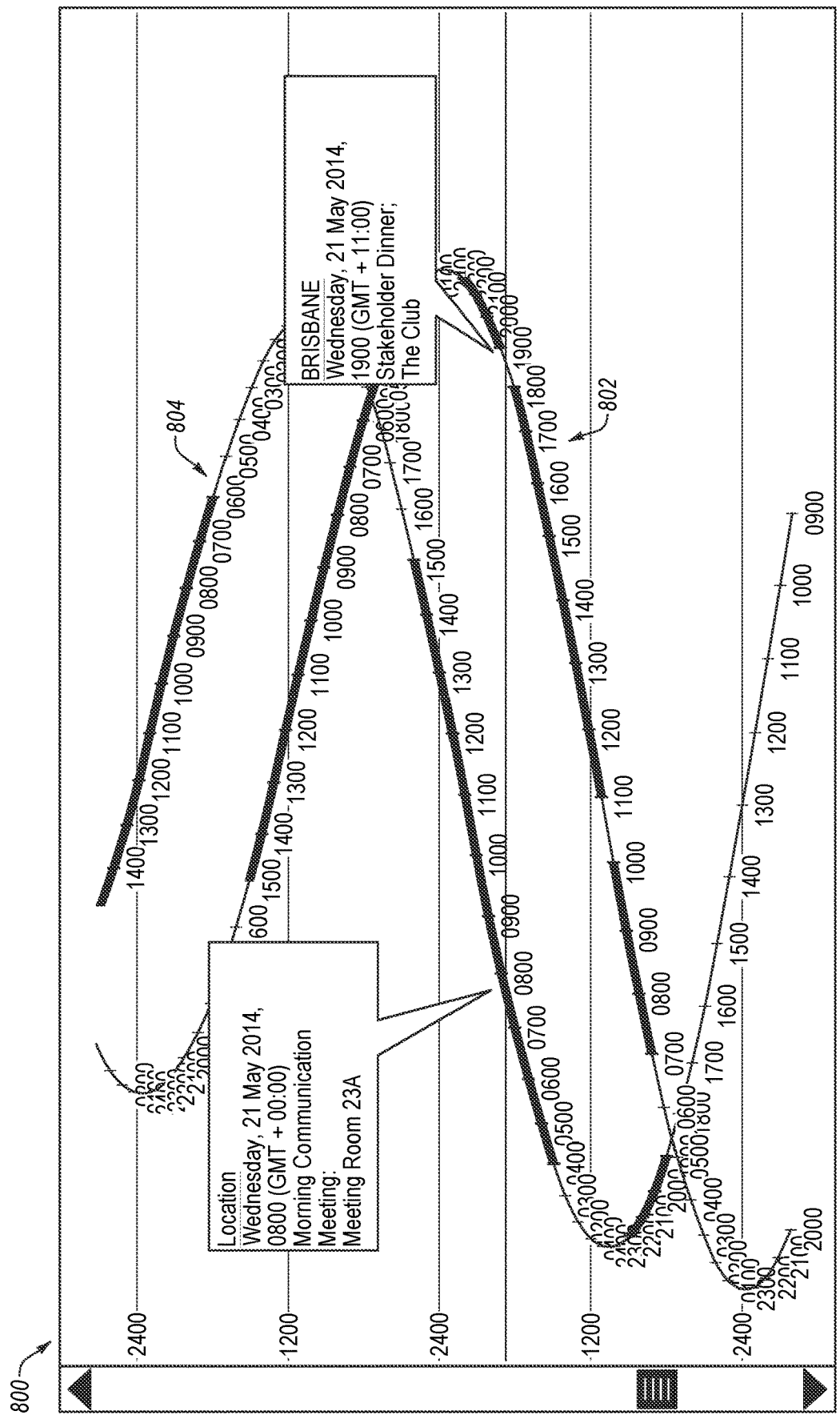
FIG. 8 is an example calendar interface showing multiple time lines in different time zones.
Figure 9:
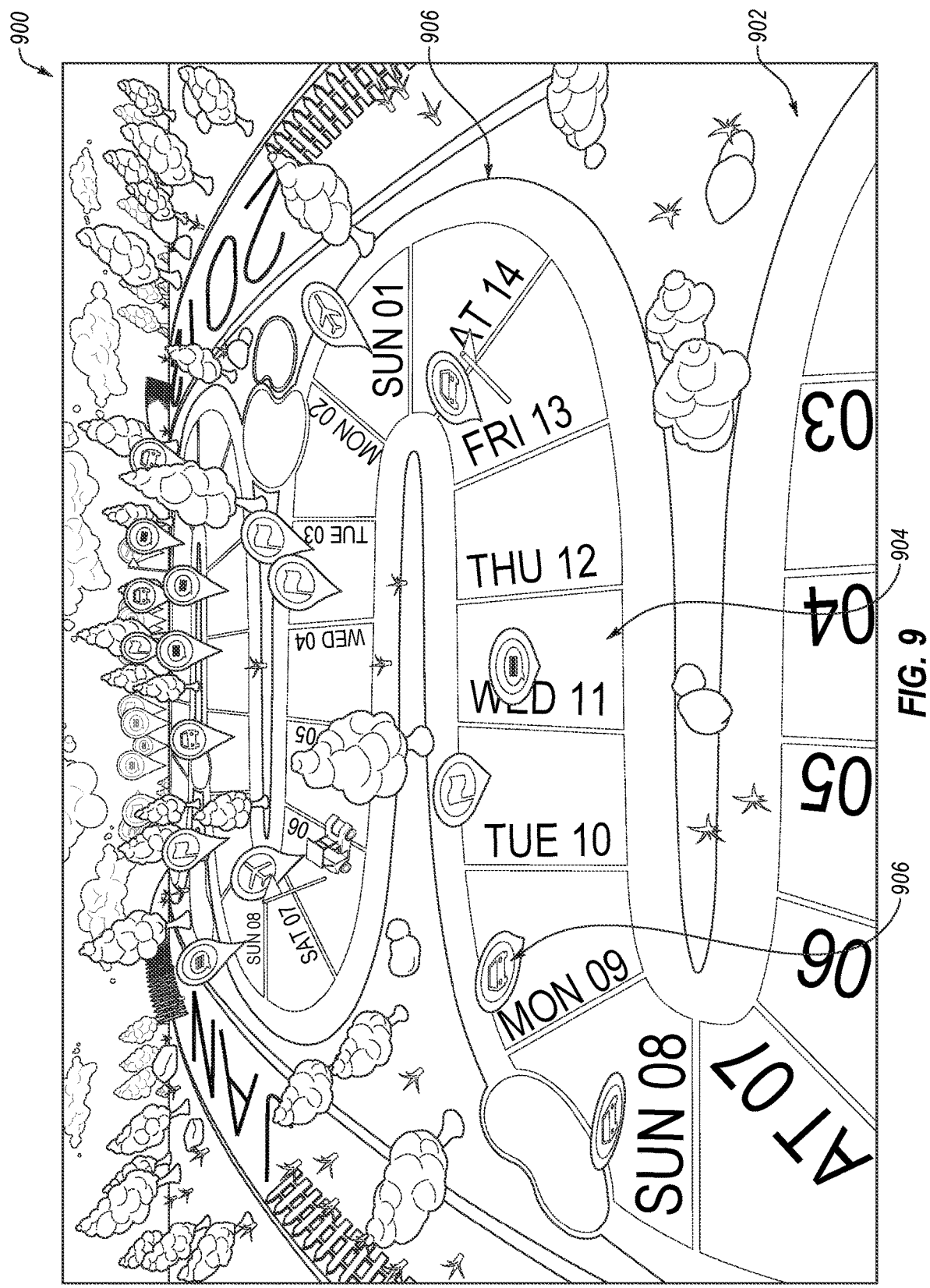
FIG. 9 is an example calendar interface with a theme.

FIGS. 7 and 8 depict embodiments in which the calendar interface displays multiple timelines.

In FIG. 7A, calendar interface 700 shows a first timeline 702 and a second timeline 704. The timelines 702 and 704 represent, in this instance, two different sets of calendar information. The two sets of calendar information may be calendar information from two different people, or calendar information from the same person relating to two different categories of calendar items (e.g. one for work events and one for personal calendar items). Timelines 702 and 704 may, for example, be described in different colours to assist in distinguishing them (e.g. one in red and one in blue).

Same Timezone

Timelines 702 and 704 are in the same time zone and are displayed such that a horizontal line crossing the timelines 702 and 704 will identify the same time on each timeline 702 and 704. For example the 7 AM time interval on timeline 702 is aligned horizontally to the 7 AM time interval on the timeline 704.

System 200 generates each timeline 702 and 704 as per the timeline generation process described above, with the exception that the timelines 702 and 704 are horizontally offset from each other. This can be achieved in a number of ways. For example (and as shown in development view 7C), instead of calculating the dimensions of single timeline display window, device 200 calculates the available timeline display area (i.e. the total display area for the calendar interface less the margins), and then calculates widths of the timeline display windows 703 and 705 (in which timelines 702 and 704 are respectively displayed) to both be displayed in the window offset from one another.

As per interface 300 (of FIG. 3) described above, timeline intervals 706 (or parts thereof) of timelines 702 and 704 that are associated with calendar items are visually distinguished from timeline intervals that are not associated with calendar items. In this instance, timeline intervals 706*a* not associated with a calendar item are shown by a thinner weight line (e.g. 706*a*), while timeline intervals or parts thereof that are associated with calendar items are displayed with heavier weight lines (e.g. 706*b*). In interface 700 calendar items associated with time lines 702 and 704 are also displayed using labels 708 and timing indicators 710 as described above.

FIG. 7B depicts an interface 750 similar to interface 700 of FIG. 7A in most respects (and the same reference numerals have been used to represent like features). In interface 750, however, additional user interface elements are displayed by device 200. These include horizontal reference lines 752 which correspond to certain times (in this instance midnight and midday) and cross timelines 702 and 704 at those reference times. A user adjustable reference line 754 is also shown which, as is described below, can be adjusted by the user to highlight any desired time on timelines 702 and 704. User adjustable reference line 754 which is visually distinguished from the horizontal references lines 752, for example by being displayed with a heavier line weight and/or in a different colour. As with interface 700 of FIG. 7A, interface 750 visually distinguishes timeline intervals 706 (or parts thereof) that are associated with calendar items from timeline intervals that are not associated with calendar items.

In interface 750, however, labels 708 and timing indicators 710 are only displayed for calendar items associated with the time indicated by the user adjustable reference line 754 (rather than having labels/indicators displayed at the same time for all calendar items associated with timelines 702 and 704). For example, in interface 750 the user adjustable reference line 754 is set at 7 am (07:00) of the first day shown by timelines 702 and 704. Accordingly, only two labels/timing indicators are shown: label 708a and indicator 710a depicting the calendar item occurring at 7 am on timeline 702; and label 708b and indicator 710b depicting the calendar item occurring at 7 am on timeline 704. For timelines with many events this reduces the complexity of the display, but still allows users to see where busy and available periods are by reference to the visual differences of the timeline intervals themselves.

Interface 750 also includes a "display all events/display reference line events" toggle control 756, in the form of a touch screen button. If the toggle control 756 is activated (e.g. by a tap or similar) whilst in an interface such as 750, labels 708 and indicators 710 for all calendar events associated with the timelines 702 and 704 are displayed (e.g. as per interface 700 of FIG. 7A). If the toggle control 756 is activated whilst in an interface such as 700 (when labels for all calendar items are already displayed), labels 708/indicators 710 are hidden except for those associated with the time indicated by the user adjustable reference line 754.

In addition, interface 750 includes a scroll-bar for controlling the user adjustable reference line 754. Scroll bar may be in addition to, or instead of, enabling movement of the user adjustable reference line 754 by touch contact as described above. The scroll bar includes up and down arrows 758 and 760 which may be activated (e.g. by a touch or pointer input) to move the user adjustable reference line 754 up and down respectively. The scroll bar also includes a thumb 72 which may be dragged up/down the track 760 to move the user adjustable reference line 754. Further, contacting a point on the track 760 may move the user adjustable reference line 754 (and thumb 762) directly to that point.

Different Timezones

FIG. 8 depicts a further calendar interface 800 which, like interfaces 700 and 750 of FIGS. 7A and 7B, shows two timelines 802 and 804. In interface 800, however, timelines 802 and 804 represent timelines occurring in different time zones. In this instance timeline 802 represents a time period in Brisbane Australia (GMT+11:00) and timeline 804 represents the same time period in London (GMT+00:00).

Timelines 802 and 804 are, generally speaking, generated and displayed as described above (e.g. using equations 3 and 4). In order to align the timelines, however, an offset_starting_point value is calculated and used in the generation in one of the timelines (in the present example the London timeline 804). The offset_starting_point serves to vertically offset the timelines so that a horizontal reference line (such as user adjustable reference line 806) crosses the timelines 802 and 804 at the same actual/absolute time. In this case user adjustable reference line crosses timeline 802 at 21 May 2014 19:00 Brisbane time which corresponds to 21 May 2014 08:00 London time. Absolute time in this sense refers to an actual point in time which may be recorded as a variety of local times. For example, an absolute time corresponding to 10 am on the east coast of Australia may (depending on daylight saving adjustments) correspond to a local time of 12 pm in New Zealand, 5 pm on the west coast of the US, 2 am in South Africa and so on.

In the present embodiment, in order to calculate the required offset value and, accordingly, the offset_starting_point value, the GMT difference between the time zones being represented is used as per equation 9 below.

$$\text{offset\_starting\_point} = \text{starting\_point} + ((\text{GMT difference}/\text{segment\_duration}) * \text{segment\_degrees})$$ [Equation 9]

Taking the timelines of FIG. 8 as an example, timeline 802 (representing Brisbane time) is generated and plotted using equations 3 and 4 above and the "normal" starting point (in this case 270 degrees). Timeline 804 (representing London time) is generated using equations 3 and 4 above but using an offset_starting_point calculated according to equation 9 (a starting_point value of 270 degrees, GMT difference of 11 hours, segment_duration of 24 hours, and segment_degrees of 180 degrees giving an offset_starting_point of 352.5 degrees).

While the above description and (FIGS. 7 and 8) describe interfaces showing two timelines, the same principles could equally be applied to displaying any desired number of timelines (depending on the practical limitation of the screen display area and resolution). Similarly, while multiple curved timelines have been described/depicted, multiple straight timelines could be generated.

Applying Themes

As mentioned, device 200 may be configured to display a calendar interface in accordance with a theme or skin. A theme defines the graphical appearance of the interface. Themes may dictate, for example, one or more of the following display options:

a background image (which, as discussed above, may have a timeline tailored thereto);

the width(s) of the timeline(s) being displayed;

the colour(s) of the timeline(s) being displayed;

the appearance of timeline intervals (or parts thereof) not associated with calendar items;

the appearance of timeline intervals (or parts thereof) associated with calendar items;

the appearances of interval separators;

the appearances of labels;

the appearance of timing indicators;

the appearances of icons or graphics displayed with different event categories.

the appearances of any other user interface elements;

By way of example, FIG. 9 depicts a calendar interface 900 showing a single timeline 902 in accordance with a golfing theme. Timeline 902 has intervals 904 representing entire days, with each segment 906 representing a week (i.e. Sunday to Saturday).

In accordance with the golf theme, various golfing metaphors are applied. For example, interface 900 is displayed with a background image depicting a part of a golf course with trees, fences, bunkers, etc. and a sky). In addition, timeline 902 is displayed as a relatively thick path through the golf course (in contrast with the simple line of the previous embodiments). The width of the timeline 902 provides for segments 904 of a sufficient size that time information (in this case the day and date) is written on each interval 904. Calendar items are indicated by icons 908 which are shaped as golf balls on golf tees, with different appearances (e.g. the colours of the icons and/or graphics) indicating different categories of calendar items (e.g. travel, meetings, due dates etc.). Additional information is also shown, including the month being displayed (on the left hand side of the interface) and the year (on the right hand side of the interface)

Different themes are, of course, possible. Pre-configured themes may be provided by device 200 for users to select. Users may also create their own themes, share themes with other users, and/or download themes from networked locations.

User Interaction with Calendar User Interface

Device 200 is configured to allow a user to interact with a given calendar interface in a variety of ways.

For example, a user may be able to add calendar items by performing an add item gesture on the touchscreen 202 at the point on the timeline at which the item is to be added. The add item gesture may, for example, be a contact made with the timeline and held substantially stationary for a pre-defined time period (i.e. a dwell gesture). If the dwell gesture is followed by a dragging gesture along a portion of the timeline, device 200 may be configured to interpret this as the intended duration of the new calendar item (i.e. the new item having a starting time corresponding to the timeline location on which the dwell was detected and an end time corresponding to the point at which contact with the screen was broken). On non-touch screen devices, an item may be added, for example, by using a pointing device (e.g. a mouse) to click on the appropriate timeline point. On receiving the add item gesture the device 200 determines the relevant time on the timeline and provides the user with an interface for adding the item (e.g. entering calendar item details). Once a new item is entered device 200 updates the calendar data structure with the new calendar item and updates the displayed interface to display the new item.

Similarly, device 200 may allow a user to modify a calendar item by performing a modify item gesture on the touch screen display. The modify item gesture may, for example, be a tap gesture on a displayed calendar item. On receiving a modify item gesture the device 200 launches a modify calendar item interface allowing the user to make changes to the item, for example to change the start/end time, the category of item, invitees (if the item is a meeting/involves other people), or details associated with the item. The user may modify the item by deleting the item entirely. Once an item is modified, device 200 updates the calendar data structure with the updated calendar item and, if necessary, updates the calendar interface displayed (e.g. to remove the item if deleted, change the item start/end time, or change the associated label).

Where a user controlled reference line is displayed (such as reference line 716 shown in FIG. 7), device 200 may be configured to allow the user to move this reference line. In the interface of FIG. 7 a scroll bar 706 provides this control. Reference line 716 may be moved up by contacting the up arrow 710 (or dragging the scroll bar thumb 712 upwards) or moved down by contacting the down arrow 708 (or dragging the thumb 712 downwards). Alternatively, the position of the reference line 716 may be controlled by a reference line adjustment gesture (e.g. contacting the touch screen at the position of the reference line and dragging up or down).

Device 200 may also allow a user to zoom in and out of the interface as described above (e.g. using appropriate controls or gestural interactions).

Device 200 may also be configured to allow a user to adjust the total time period displayed. This may be by specific controls (e.g. a "view next day/week" and "view previous day/week" touch screen buttons), or may be by next and previous time period adjustment gestures. For example, on receiving a two-fingered swipe gesture moving substantially upwards on the touch screen display, device 200 may display a previous time period (e.g. the day or week immediately before the start of the displayed timeline). Similarly, on receiving a two-fingered swipe gesture moving substantially downwards on the touch screen display, device 200 may display a next time period (e.g. the day or week immediately after the end of the displayed timeline). On receiving a next or previous time period command device 200 recalculates and redisplays the timeline, and retrieves and displays calendar items associated with the new timeline period.

System 200 may also provide a settings control (e.g. via an appropriate button), which allows a user to adjust the interface parameters (e.g. start time, total time displayed, timeline type, theme).

Various equations for generating/plotting timelines in accordance with embodiments have been described above. It will be appreciated, however, that alternative equations (using the same or alternative parameters) could be used to generate straight and/or curved timelines incorporating various principles of the disclosure.

It will also be understood that the invention disclosed and defined in this specification extends to all alternative combinations of two or more of the individual features mentioned or evident from the text or drawings. All of these different combinations constitute various alternative aspects of the invention.

The invention claimed is:

1. A computer implemented method for generating a calendar interface for display on an electronic device display, the method including:
   determining a total time period value indicating a total time period to be displayed;
   determining a segment duration;
   determining an interval duration;
   calculating timeline coordinates defining a timeline extending from a foreground of the display to a background of the display and having a perspective appearance;
   displaying, on the display, a timeline in accordance with the timeline coordinates;
   determining one or more calendar items, each calendar item being associated with a time occurring in the total time period; and
   displaying, on the display, at least one calendar item in a position on the timeline associated with the calendar item's associated time;
   wherein:
      the timeline coordinates define the timeline to have a plurality of segments;
      each segment represents a period of time within the total time period equal to the segment duration;
      each segment is composed of a plurality of timeline intervals, each timeline interval representing a period of time within the total time period equal to the interval duration;
      each segment has a display length, and wherein the display length of a segment representing an earlier period of time is longer than a display length of a segment representing a later period of time;
      a given segment travels in a direction that is re-entrant relative to a direction travelled by an adjacent segment;
      each timeline interval is represented by an interval line;
      the segment duration is a day; and for a given segment, interval lines representing time periods occurring closer to midday of the day are longer than interval lines representing time periods occurring closer to midnight of the day.

2. The computer implemented method according to claim 1, wherein calculating timeline coordinates includes calculating starting point coordinates for each of the plurality of timeline intervals based on the total time period value, the segment duration, and the interval duration.

3. The computer implemented method according to claim 1, wherein calculating timeline coordinates includes calculating coordinates of a timeline start point, a timeline end point, and one or more timeline inflection points.

4. The computer implemented method according to claim 3, wherein each timeline segment is a substantially straight line extending between adjacent control points, the control points including the timeline start point, the timeline end point, and the one or more timeline inflection points.

5. The computer implemented method according to claim 1, wherein the method includes generating and displaying at least two timelines.

6. The computer implemented method according to claim 5, wherein the at least two timelines are generated and displayed such that a straight line passing through the timelines indicates a same time on each timeline.

7. The computer implemented method according to claim 6, wherein the at least two timelines are in different time zones and are generated and displayed such that a horizontal line passing through the timelines indicates a same absolute time on each timeline.

8. The computer implemented method according to claim 1, further including displaying interval markers at locations corresponding to the starting points of each timeline interval.

9. The computer implemented method according to claim 1, wherein timeline intervals or parts thereof associated with a calendar item are visually distinguished from timeline intervals or parts thereof that are not associated with a calendar item.

10. The computer implemented method according to claim 9, wherein timeline intervals or parts thereof are visually distinguished by one or more of: a different line colour; a different line weight; a different line composition.

11. The computer implemented method according to claim 1, further including displaying an adjustable reference line indicating a point in time on the timeline, and wherein only calendar items associated with the point in time indicated by the adjustable reference line are displayed.

12. The computer implemented method according to claim 1, wherein the timeline is a curved timeline with coordinates based on a sinusoidal equation.

13. The computer implemented method according to claim 1, the method further including:
    determining a theme for the calendar interface, the theme including at least a background image atop which the timeline is displayed; and
    applying the theme to the calendar interface.

14. The computer implemented method according to claim 1, wherein the timeline coordinates define the timeline to have at least three segments, each segment travelling in a direction that is re-entrant relative to directions travelled by any adjacent segments.

15. An electronic device including:
    a processing unit;
    a display; and
    computer-readable memory storing instructions which, when executed by said processing unit, cause said processing unit to perform a method including:
        determining a total time period value indicating a total time period to be displayed;
        determining a segment duration;
        determining an interval duration;
        calculating timeline coordinates defining a timeline extending from a foreground of the display to a background of the display and having a perspective appearance;
        displaying, on the display, a timeline in accordance with the timeline coordinates;
        determining one or more calendar items, each calendar item being associated with a time occurring in the total time period; and
        displaying, on the display, at least one calendar item in a position on the timeline associated with the calendar item's associated time;
    wherein:
        the timeline coordinates define the timeline to have a plurality of segments;
        each segment represents a period of time within the total time period equal to the segment duration;
        each segment is composed of a plurality of timeline intervals, each timeline interval representing a period of time within the total time period equal to the interval duration;
        each segment has a display length, and wherein the display length of a segment representing an earlier period of time is longer than a display length of a segment representing a later period of time;
        a given segment travels in a direction that is re-entrant relative to a direction travelled by an adjacent segment;
        each timeline interval is represented by an interval line;
        the segment duration is a day; and
        for a given segment, interval lines representing time periods occurring closer to midday of the day are longer than interval lines representing time periods occurring closer to midnight of the day.

16. Non-transient memory storing instructions executable by a computer processing unit to perform a method including:
    determining a total time period value indicating a total time period to be displayed;
    determining a segment duration;
    determining an interval duration;
    calculating timeline coordinates defining a timeline extending from a foreground of the display to a background of the display and having a perspective appearance;
    displaying, on the display, a timeline in accordance with the timeline coordinates;
    determining one or more calendar items, each calendar item being associated with a time occurring in the total time period; and
    displaying, on the display, at least one calendar item in a position on the timeline associated with the calendar item's associated time;
    wherein:
        the timeline coordinates define the timeline to have a plurality of segments;
        each segment represents a period of time within the total time period equal to the segment duration;

each segment is composed of a plurality of timeline intervals, each timeline interval representing a period of time within the total time period equal to the interval duration;

each segment has a display length, and wherein the display length of a segment representing an earlier period of time is longer than a display length of a segment representing a later period of time;

a given segment travels in a direction that is re-entrant relative to a direction travelled by an adjacent segment;

each timeline interval is represented by an interval line;

the segment duration is a day; and for a given segment, interval lines representing time periods occurring closer to midday of the day are longer than interval lines representing time periods occurring closer to midnight of the day.

* * * * *